(12) United States Patent
Volkerink et al.

(10) Patent No.: US 11,900,195 B2
(45) Date of Patent: Feb. 13, 2024

(54) TEARING TO TURN ON WIRELESS NODE WITH MULTIPLE CUTOUTS FOR RE-USE

(71) Applicant: Trackonomy Systems, Inc., San Jose, CA (US)

(72) Inventors: Hendrik J Volkerink, Palo Alto, CA (US); Ajay Khoche, West San Jose, CA (US)

(*) Notice: Subject to any disclaimer, the term of this patent is extended or adjusted under 35 U.S.C. 154(b) by 0 days.

(21) Appl. No.: 17/385,884

(22) Filed: Jul. 26, 2021

(65) Prior Publication Data

US 2022/0027698 A1 Jan. 27, 2022

Related U.S. Application Data

(60) Provisional application No. 63/056,121, filed on Jul. 24, 2020.

(51) Int. Cl.
| | |
|---|---|
| *G06K 19/07* | (2006.01) |
| *G06K 7/00* | (2006.01) |
| *H04W 52/02* | (2009.01) |

(52) U.S. Cl.
CPC ....... *G06K 19/0705* (2013.01); *G06K 7/0008* (2013.01); *G06K 19/0723* (2013.01); *H04W 52/0229* (2013.01)

(58) Field of Classification Search
CPC ............. G06K 19/0705; G06K 7/0008; G06K 19/0723; H04W 52/0229
USPC ........................................................ 235/492
See application file for complete search history.

(56) References Cited

U.S. PATENT DOCUMENTS

| | | | |
|---|---|---|---|
| 5,313,052 A | 5/1994 | Watanabe et al. | |
| 5,478,991 A | 12/1995 | Watanabe | |
| 5,495,250 A | 2/1996 | Ghaem et al. | |
| 5,499,717 A | 3/1996 | Hayashi | |
| 5,838,253 A * | 11/1998 | Wurz ................... | G06K 19/077 340/505 |
| 6,372,342 B1 | 4/2002 | Karaoglu | |
| 6,375,780 B1 | 4/2002 | Tuttle et al. | |

(Continued)

FOREIGN PATENT DOCUMENTS

| | | |
|---|---|---|
| EP | 1786143 | 5/2007 |
| EP | 2 194 519 A1 | 9/2010 |

(Continued)

OTHER PUBLICATIONS

International Patent Application No. PCT/US2021/043253, International Search Report and Written Opinion dated Oct. 22, 2021, 8 pages.

(Continued)

*Primary Examiner* — Michael G Lee
*Assistant Examiner* — David Tardif

(57) ABSTRACT

A wireless tag includes a main body comprising an embedded wireless transducing circuit. coupled to a parallel arrangement of resistive loops embedded in respective tabs extending from the main body of the wireless tag. The wireless transducing circuit includes a globally unique identifier, a battery, a processor, a memory comprising processor-readable instructions, and a wireless communications interface; and a wake circuit configured to turn-on in response to an open circuit occurring in a respective tab. The wireless transducing circuit is configured to turn on responsive to the wake circuit receiving a voltage level above a threshold.

21 Claims, 17 Drawing Sheets

(56) References Cited

U.S. PATENT DOCUMENTS

| | | |
|---|---|---|
| 6,404,341 B1 | 6/2002 | Reid |
| 6,614,392 B2 | 9/2003 | Howard |
| 7,020,701 B1 | 3/2006 | Gelvin et al. |
| 7,048,194 B2 | 5/2006 | Minami et al. |
| 7,177,054 B2 | 2/2007 | Silverbrook et al. |
| 7,259,030 B2 | 8/2007 | Daniels et al. |
| 7,299,990 B2 | 11/2007 | Hoshina |
| 7,321,167 B2 | 1/2008 | Zhong et al. |
| 7,405,656 B2 | 7/2008 | Olsen |
| 7,511,616 B2 | 3/2009 | Lake |
| 7,540,603 B2 | 6/2009 | Otsuki |
| 7,722,249 B2 | 5/2010 | Kim et al. |
| 7,746,230 B2 | 6/2010 | Tuttle |
| 7,838,844 B2 | 11/2010 | Wagner et al. |
| 7,884,727 B2 | 2/2011 | Tran |
| 8,072,620 B2 | 12/2011 | Yamamoto et al. |
| 8,110,254 B1 | 2/2012 | Sharma et al. |
| 8,269,633 B2 | 9/2012 | Hollander et al. |
| 8,292,173 B2 * | 10/2012 | Yturralde ........... G06K 19/0776 235/385 |
| 8,401,238 B2 | 3/2013 | Stahlin et al. |
| 8,448,530 B2 | 5/2013 | Leuenberger et al. |
| 8,658,455 B2 | 2/2014 | Shin et al. |
| 8,716,629 B2 | 5/2014 | Klewer et al. |
| 8,786,510 B2 | 7/2014 | Coleman et al. |
| 8,833,664 B2 | 9/2014 | Choi |
| 8,879,276 B2 | 11/2014 | Wang |
| 8,971,673 B2 | 3/2015 | Beinhocker |
| 9,070,286 B2 | 6/2015 | Moore |
| 9,137,637 B2 | 9/2015 | Bilal et al. |
| 9,159,635 B2 | 10/2015 | Elolampi et al. |
| 9,182,231 B2 | 11/2015 | Skaaksrud |
| 9,183,738 B1 | 11/2015 | Allen, Sr. et al. |
| 9,250,104 B2 | 2/2016 | Greiner et al. |
| 9,372,123 B2 | 6/2016 | Li et al. |
| 9,473,902 B2 | 10/2016 | Bilal et al. |
| 9,496,582 B1 | 11/2016 | Lim et al. |
| 9,543,495 B2 | 1/2017 | Paschkewitz et al. |
| 9,543,549 B2 | 1/2017 | Bai et al. |
| 9,583,428 B2 | 2/2017 | Rafferty et al. |
| 9,632,050 B2 | 4/2017 | Zhong et al. |
| 9,643,460 B2 | 5/2017 | Peine et al. |
| 9,693,689 B2 | 7/2017 | Gannon et al. |
| 9,753,568 B2 | 9/2017 | McMillen |
| 9,781,825 B2 | 10/2017 | Farkas et al. |
| 9,860,688 B2 | 1/2018 | Kulkarni et al. |
| 10,108,898 B1 * | 10/2018 | Ballam ............ G06K 19/07798 |
| 10,872,286 B2 * | 12/2020 | Khoche .............. G06K 19/0702 |
| 2003/0000128 A1 | 1/2003 | Wood et al. |
| 2004/0044493 A1 | 3/2004 | Coulthard |
| 2004/0131761 A1 | 7/2004 | Shakespeare |
| 2006/0100299 A1 | 5/2006 | Malik et al. |
| 2007/0049291 A1 | 3/2007 | Kim et al. |
| 2007/0287473 A1 | 8/2007 | Dupray |
| 2008/0174422 A1 | 7/2008 | Freathy et al. |
| 2008/0198002 A1 | 8/2008 | Bartholf et al. |
| 2009/0051530 A1 | 2/2009 | Brooks et al. |
| 2009/0072974 A1 | 3/2009 | Miyashita et al. |
| 2009/0174600 A1 | 7/2009 | Mazlum et al. |
| 2009/0192709 A1 | 7/2009 | Yonker et al. |
| 2009/0196267 A1 | 8/2009 | Walker, Sr. |
| 2010/0180701 A1 | 7/2010 | Daniel et al. |
| 2010/0230498 A1 | 9/2010 | Atherton |
| 2011/0218756 A1 | 9/2011 | Callsen et al. |
| 2011/0251469 A1 | 10/2011 | Varadan |
| 2012/0242481 A1 | 9/2012 | Gernandt et al. |
| 2012/0271540 A1 | 10/2012 | Miksa et al. |
| 2013/0131980 A1 | 5/2013 | Ginsberg |
| 2013/0250357 A1 | 9/2013 | Yu |
| 2014/0014403 A1 | 1/2014 | Miller et al. |
| 2014/0240088 A1 | 8/2014 | Robinette et al. |
| 2014/0265915 A1 | 9/2014 | Huang et al. |
| 2014/0268780 A1 | 9/2014 | Wang et al. |
| 2014/0274139 A1 | 9/2014 | Bilal et al. |
| 2014/0317406 A1 | 10/2014 | Lewis et al. |
| 2014/0362890 A1 | 12/2014 | Qian |
| 2015/0349667 A1 | 12/2015 | Andosca et al. |
| 2015/0354973 A1 | 12/2015 | Wang et al. |
| 2015/0382154 A1 | 12/2015 | Bilal et al. |
| 2016/0011074 A1 | 1/2016 | Mian et al. |
| 2016/0026213 A1 | 1/2016 | Li et al. |
| 2016/0147353 A1 | 5/2016 | Filiz et al. |
| 2016/0205509 A1 | 7/2016 | Hopcraft et al. |
| 2016/0270215 A1 | 9/2016 | Goto |
| 2016/0370210 A1 | 12/2016 | Kapusta et al. |
| 2016/0377440 A1 | 12/2016 | Dorum |
| 2017/0017872 A1 | 1/2017 | Kato et al. |
| 2017/0025547 A1 | 1/2017 | Cho et al. |
| 2017/0079144 A1 | 3/2017 | Coleman et al. |
| 2017/0161679 A1 | 6/2017 | Stingel et al. |
| 2017/0337405 A1 | 11/2017 | Schutz |
| 2018/0003507 A1 | 1/2018 | Arslan et al. |
| 2018/0104609 A1 | 4/2018 | Musliner |
| 2018/0110450 A1 | 4/2018 | Lamego et al. |
| 2021/0133696 A1 | 5/2021 | Volkerink et al. |
| 2021/0150159 A1 | 5/2021 | Volkerink et al. |

FOREIGN PATENT DOCUMENTS

| | | |
|---|---|---|
| JP | 1994115676 A | 4/1994 |
| JP | 2008239282 | 10/2008 |
| JP | 2008239282 A | 10/2008 |
| JP | 2009230500 | 10/2009 |
| JP | 2011090670 A | 5/2011 |
| JP | 2012141995 A | 7/2012 |
| WO | WO 2014195756 | 12/2014 |
| WO | WO 2016120628 | 8/2016 |
| WO | WO 2017046699 | 3/2017 |
| WO | WO 2017100707 | 7/2017 |

OTHER PUBLICATIONS

A Dementyev, H .- L. C. Kao, J. Paradiso, "SensorTape: Modular and Programmable 3D-Aware Dense Sensor Network on a Tape", In Proc. of UIST 2015.

Daniel K. Griffin et al., Adhesive RFID Sensor Patch for Monitoring of Sweat Electrolytes, in IEEE transactions on bio-medical engineering—Nov. 2014.

Jong-Sun Pyo et al., "Development of a map matching method using the multiple hypothesis technique," 2001 IEEE Intelligent Transportation Systems Conference Proceedings—Oakland (CA), USA—Aug. 25-29, 2001.

Junjie Liu, Survey of Wireless Based Indoor Localization Technologies, arXiv: 1709.01015v2 [cs.NI] Mar. 14, 2018.

K. W. Cheung et al., "Least Squares Algorithms for Time-of-Arrival-Based Mobile Location," IEEE Transactions on Signal Processing, vol. 52, No. 4, Apr. 2004, pp. 1121-1128.

Kelvin M. Frazier et al., Fully-Drawn Carbon-Based Chemical Sensors on Organic and Inorganic Surfaces, Lab Chip. Oct. 21, 2014; 14(20): 4059-4066. doi: 10.1039/c4lc00864b.

Alsheikh et al., "Machine Learning in Wireless Sensor Networks: Algorithms, Strategies, and Applications," arXiv: 1405.4463v2 [cs.NI] Mar. 19, 2015.

Farooqui et al., "A paper based ink jet printed real time location tracking TAG," 2013 IEEE MTT-S International Microwave Symposium Digest (MTT).

N .-W. Gong, C .-Y. Wang and J. A. Paradiso, "Low-cost Sensor Tape for Environmental Sensing Based on Roll-to-roll Manufacturing Process," In Proc. of IEEE Sensors 2012.

Olyazadeh, Roya. (2012). Least Square Approach on Indoor Positioning Measurement Techniques.

Raphael Wimmer et al., Modular and deformable touch-sensitive surfaces based on time domain reflectometry, UIST 11 Proceedings of the 24th annual ACM symposium on User interface software and technology, pp. 517-526, Santa Barbara, California, USA—Oct. 16-19, 2011.

Simon Olberding et al., A cuttable multi-touch sensor, Proceeding UIST '13 Proceedings of the 26th annual ACM symposium on User

(56) References Cited

OTHER PUBLICATIONS interface software and technologypp. 245-254, St. Andrews, Scotland, United Kingdom—Oct. 8-11, 2013.
Wei Zhang et al., Deep Neural Networks for wireless localization in indoor and outdoor environments, Neurocomputing 194 (2016)279-287.
Notification of Transmittal of the International Search Report and the Written Opinion dated Mar. 29, 2019, in International Application No. PCT/US2018/064855, filed Dec. 11, 2018.
PCT Application No. PCT/US2018/064919, Written Opinion and International Search Report, dated Apr. 2019, 10 pages.
U.S. Appl. No. 16/950,826, Non-Final Office Action dated Aug. 25, 2021, 23 pages.
U.S. Patent Application No. 17/714,146 Non-Final Office Action dated Aug. 10, 2023, 19 pages.

\* cited by examiner

TEARING TO TURN ON WIRELESS NODE WITH MULTIPLE CUTOUTS FOR RE-USE

FIELD OF THE DISCLOSURE

This disclosure generally relates to wireless internet of things (TOT) devices.

BACKGROUND

For wireless internet of things (TOT) devices that are battery powered, the capacity of the battery limits the usefulness and practicality of operating a fleet of IOT devices. The battery capacity may constrain the functionality of the IOT device. It is desirable to conserve the battery of IOT devices.

SUMMARY

According to some embodiments, a wireless tag includes a main body and respective tabs extending from the main body. The main body includes an embedded wireless transducing circuit coupled to a parallel arrangement of resistive loops embedded in respective tabs extending from the main body of the wireless tag. The wireless transducing circuit includes a globally unique identifier, a battery, a processor, a memory comprising processor-readable instructions, and a wireless communications interface. A first tab of the respective tabs is connected to the main body, and the first tab includes a first portion of the resistive loops, wherein an incision in the first tab causes an open circuit in the first portion of the resistive loops. A wake circuit is configured to turn-on in response to an open circuit occurring in the first portion of the resistive loops, wherein the wireless transducing circuit is configured to turn on responsive to the wake circuit receiving a voltage level above a first threshold voltage.

According to some embodiments, a method for reusing a wireless tag includes activating a wireless transducing circuit of a wireless tag, by making a first incision in a first portion of the wireless tag. The first incision creates an open circuit in a first branch of a circuit located in the first portion of the wireless tag. In response to detecting an open circuit in the first branch of the circuit, a wake circuit of the wireless tag is activated, powering on the wireless transducing circuit.

After some time, the wireless transducing circuit deactivates in response to satisfying a first criteria corresponding to a first job or journey of the wireless tag. The wireless transducing circuit of the wireless tag is reactivated, by making a second incision in a second portion of the wireless tag. The second incision creates an open circuit in a second branch the circuit located in the second portion of the wireless tag. In response to detecting an open circuit in the second branch of the circuit, a wake circuit of the wireless tag is activated, powering on the wireless transducing circuit.

DETAILED DESCRIPTION

Figure 1A:
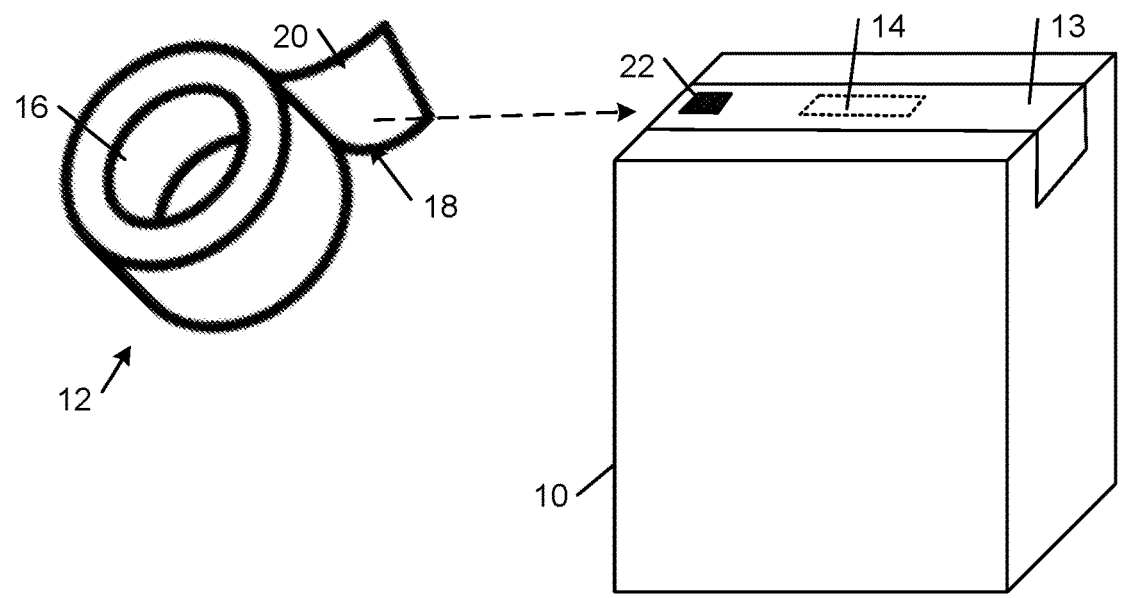
FIG. 1A is a diagrammatic view of an asset that has been sealed for shipment using a segment of an example adhesive tape platform dispensed from a roll, according to some embodiments.

A wireless tag that conserves its battery by deactivating itself when not in use and reactivating in response to a user tearing or cutting a portion of the wireless tag is disclosed, according to some embodiments. By deactivating when not in use, the wireless tag may conserve its battery for times when the functionality of the wireless tag is required by a user of the system. A system and method thereof for reusing wireless tags is also disclosed, according to some embodiments. The wireless tag may also be referred to herein as a "tape node" or "adhesive tape platform."

In some embodiments, the wireless IOT device is an adhesive tape platform or a segment thereof. The adhesive tape platform includes wireless transducing components and circuitry that perform communication and/or sensing. The adhesive tape platform has a flexible adhesive tape formfactor that allows it to function as both an adhesive tape for adhering to and/or sealing objects and a wireless sensing device.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements and are not drawn to scale.

As used herein, the term "or" refers to an inclusive "or" rather than an exclusive "or." In addition, the articles "a" and "an" as used in the specification and claims mean "one or more" unless specified otherwise or clear from the context to refer the singular form.

The term "tape node" refers to an adhesive tape platform or a segment thereof that is equipped with sensor, processor, memory, energy source/harvesting mechanism, and wireless communications functionality, where the adhesive tape platform (also referred to herein as an "adhesive product" or an "adhesive tape product") has a variety of different form factors, including a multilayer roll or a sheet that includes a plurality of divisible adhesive segments. Once deployed, each tape node can function, for example, as an adhesive tape, label, sticker, decal, or the like, and as a wireless communications device.

The terms "adhesive tape node," "wireless node," or "tape node" may be used interchangeably in certain contexts, and refer to an adhesive tape platform or a segment thereof that is equipped with sensor, processor, memory, energy source/harvesting mechanism, and wireless communications functionality, where the adhesive product has a variety of different form factors, including a multilayer roll or a sheet that includes a plurality of divisible adhesive segments. Once deployed, each tape node or wireless node can function, for example, as an adhesive tape, label, sticker, decal, or the like, and as a wireless communications device. A "peripheral" tape node or wireless node, also referred to as an outer node, leaf node, or terminal node, refers to a node that does not have any child nodes.

In certain contexts, the terms "parcel," "envelope," "box," "package," "container," "pallet," "carton," "wrapping," and the like are used interchangeably herein to refer to a packaged item or items.

In certain contexts, the terms "wireless tracking system," "hierarchical communications network," "distributed agent operating system," and the like are used interchangeably herein to refer to a system or network of wireless nodes.

Introduction

This specification describes a low-cost, multi-function adhesive tape platform with a form factor that unobtrusively integrates the components useful for implementing a combination of different asset tracking and management functions and also is able to perform a useful ancillary function that otherwise would have to be performed with the attendant need for additional materials, labor, and expense. In an aspect, the adhesive tape platform is implemented as a collection of adhesive products that integrate wireless communications and sensing components within a flexible adhesive structure in a way that not only provides a cost-effective platform for interconnecting, optimizing, and protecting the components of the tracking system but also maintains the flexibility needed to function as an adhesive product that can be deployed seamlessly and unobtrusively into various asset management and tracking applications and workflows, including person and object tracking applications, and asset management workflows such as manufacturing, storage, shipping, delivery, and other logistics associated with moving products and other physical objects, including logistics, sensing, tracking, locationing, warehousing, parking, safety, construction, event detection, road management and infrastructure, security, and healthcare. In some examples, the adhesive tape platforms are used in various aspects of asset management, including sealing assets, transporting assets, tracking assets, monitoring the conditions of assets, inventorying assets, and verifying asset security. In these examples, the assets typically are transported from one location to another by truck, train, ship, or aircraft or within premises, e.g., warehouses by forklift, trolleys etc.

In disclosed examples, an adhesive tape platform includes a plurality of segments that can be separated from the adhesive product (e.g., by cutting, tearing, peeling, or the like) and adhesively attached to a variety of different surfaces to inconspicuously implement any of a wide variety of different wireless communications based network communications and transducing (e.g., sensing, actuating, etc.) applications. Examples of such applications include: event detection applications, monitoring applications, security applications, notification applications, and tracking applications, including inventory tracking, asset tracking, person tracking, animal (e.g., pet) tracking, manufactured parts tracking, and vehicle tracking. In example embodiments, each segment of an adhesive tape platform is equipped with an energy source, wireless communication functionality, transducing functionality, and processing functionality that enable the segment to perform one or more transducing functions and report the results to a remote server or other computer system directly or through a network of tapes. The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and or environment of, for example, an article, object, vehicle, or person, over time.

Systems and processes for fabricating flexible multifunction adhesive tape platforms in efficient and low-cost ways also are described. In addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that can provide local sensing, wireless transmitting, and locationing functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other asset tracking and management applications across heterogeneous environments.

Adhesive Tape Platform

FIG. 1A shows an example asset 10 that is sealed for shipment using an example adhesive tape platform 12 that includes embedded components of a wireless transducing circuit 14 (collectively referred to herein as a "tape node"). In this example, a length 13 of the adhesive tape platform 12 is dispensed from a roll 16 and affixed to the asset 10. The adhesive tape platform 12 includes an adhesive side 18 and a non-adhesive side 20. The adhesive tape platform 12 can be dispensed from the roll 16 in the same way as any conventional packing tape, shipping tape, or duct tape. For example, the adhesive tape platform 12 may be dispensed from the roll 16 by hand, laid across the seam where the two top flaps of the asset 10 meet, and cut to a suitable length either by hand or using a cutting instrument (e.g., scissors or an automated or manual tape dispenser). Examples of such tapes include tapes having non-adhesive sides 20 that carry one or more coatings or layers (e.g., colored, light reflective, light absorbing, and/or light emitting coatings or layers).

Figure 1B:
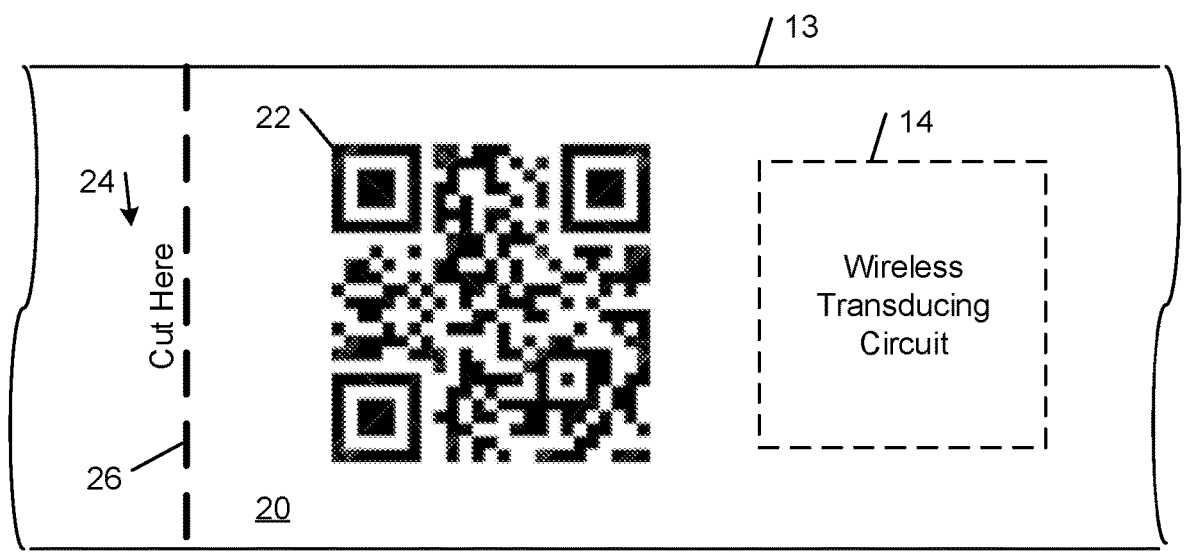
FIG. 1B is a diagrammatic top view of a portion of the segment of the example adhesive tape platform shown in FIG. 1A, according to some embodiments.

Referring to FIG. 1B, in some examples, the non-adhesive side 20 of the length 13 of the adhesive tape platform 12 includes writing or other markings that convey instructions, warnings, or other information to a person or machine (e.g., a bar code reader), or may simply be decorative and/or entertaining. For example, different types of adhesive tape platforms may be marked with distinctive colorations to distinguish one type of adhesive tape platform from another. In the illustrated example, the length 13 of the adhesive tape platform 12 includes a two-dimensional bar code (e.g., a QR Code) 22, written instructions 24 (i.e., "Cut Here"), and an associated cut line 26 that indicates where the user should cut the adhesive tape platform 12. The written instructions 24 and the cut line 26 typically are printed or otherwise marked on the top non-adhesive surface 20 of the adhesive tape platform 12 during manufacture. The two-dimensional bar code 22, on the other hand, may be marked on the non-adhesive surface 20 of the adhesive tape platform 12 during the manufacture of the adhesive product 12 or, alternatively, may be marked on the non-adhesive surface 20 of the adhesive tape platform 12 as needed using, for example, a printer or other marking device.

In order to avoid damage to the functionality of the segments of the adhesive tape platform 12, the cut lines 26 typically demarcate the boundaries between adjacent segments at locations that are free of any active components of the wireless transducing circuit 14. The spacing between the wireless transducing circuit components 14 and the cut lines 26 may vary depending on the intended communication, transducing and/or adhesive taping application. In the example illustrated in FIG. 1A, the length of the adhesive tape platform 12 that is dispensed to seal the asset 10 corresponds to a single segment of the adhesive tape platform 12. In other examples, the length of the adhesive tape platform 12 needed to seal a asset or otherwise serve the adhesive function for which the adhesive tape platform 12 is being applied may include multiple segments 13 of the adhesive tape platform 12, one or more of which segments 13 may be activated upon cutting the length of the adhesive tape platform 12 from the roll 16 and/or applying the length of the adhesive tape platform to the asset 10.

In some examples, the transducing components 14 that are embedded in one or more segments 13 of the adhesive tape platform 12 are activated when the adhesive tape platform 12 is cut along the cut line 26. In these examples, the adhesive tape platform 12 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the transducing components 14 in one or more segments of the adhesive tape platform 12 in response to being separated from the adhesive tape platform 12 (e.g., along the cut line 26).

In some examples, each segment 13 of the adhesive tape platform 12 includes its own respective energy source including energy harvesting elements that can harvest energy from the environment. In some of these examples, each energy source is configured to only supply power to the components in its respective adhesive tape platform segment regardless of the number of contiguous segments 13 that are in a given length of the adhesive tape platform 12. In other examples, when a given length of the adhesive tape platform 12 includes multiple segments 13, the energy sources in the respective segments 13 are configured to supply power to the transducing components 14 in all of the segments 13 in the given length of the adhesive tape platform 12. In some of these examples, the energy sources are connected in parallel and concurrently activated to power the transducing components 14 in all of the segments 13 at the same time. In other examples, the energy sources are connected in parallel and alternately activated to power the transducing components 14 in respective ones of the adhesive tape platform segments 13 at different time periods, which may or may not overlap.

Figure 2:
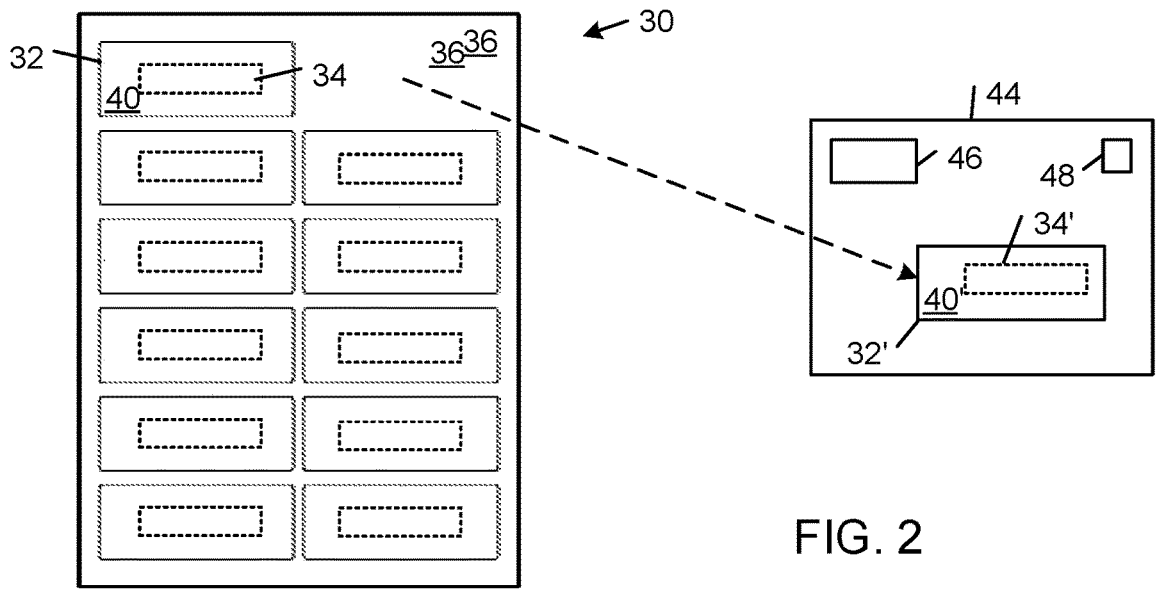
FIG. 2 is a diagrammatic view of an example of an envelope carrying a segment of an example adhesive tape platform dispensed from a backing sheet, according to some embodiments.

FIG. 2 shows an example adhesive tape platform 30 that includes a set of adhesive tape platform segments 32 each of which includes a respective set of embedded wireless transducing circuit components 34, and a backing sheet 36 with a release coating that prevents the adhesive segments 32 from adhering strongly to the backing sheet 36. Each adhesive tape platform segment 32 includes an adhesive side facing the backing sheet 36, and an opposing non-adhesive side 40. In this example, a particular segment 32' of the adhesive tape platform 30 has been removed from the backing sheet 36 and affixed to an envelope 44. Each segment 32 of the adhesive tape platform 30 can be removed from the backing sheet 36 in the same way that adhesive labels can be removed from a conventional sheet of adhesive labels (e.g., by manually peeling a segment 32 from the backing sheet 36). In general, the non-adhesive side 40' of the segment 32' may include any type of writing, markings, decorative designs, or other ornamentation. In the illustrated example, the non-adhesive side 40' of the segment 32' includes writing or other markings that correspond to a destination address for the envelope 44. The envelope 44 also includes a return address 46 and, optionally, a postage stamp or mark 48.

In some examples, segments of the adhesive tape platform 12 are deployed by a human operator. The human operator may be equipped with a mobile phone or other device that allows the operator to authenticate and initialize the adhesive tape platform 12. In addition, the operator can take a picture of a asset including the adhesive tape platform and any barcodes associated with the asset and, thereby, create a persistent record that links the adhesive tape platform 12 to the asset. In addition, the human operator typically will send the picture to a network service and/or transmit the picture to the adhesive tape platform 12 for storage in a memory component of the adhesive tape platform 12.

In some examples, the wireless transducing circuit components 34 that are embedded in a segment 32 of the adhesive tape platform 12 are activated when the segment 32 is removed from the backing sheet 32. In some of these examples, each segment 32 includes an embedded capacitive sensing system that can sense a change in capacitance when the segment 32 is removed from the backing sheet 36. As explained in detail below, a segment 32 of the adhesive tape platform 30 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 34 in the segment 32 in response to the detection of a change in capacitance between the segment 32 and the backing sheet 36 as a result of removing the segment 32 from the backing sheet 36.

Figure 3:
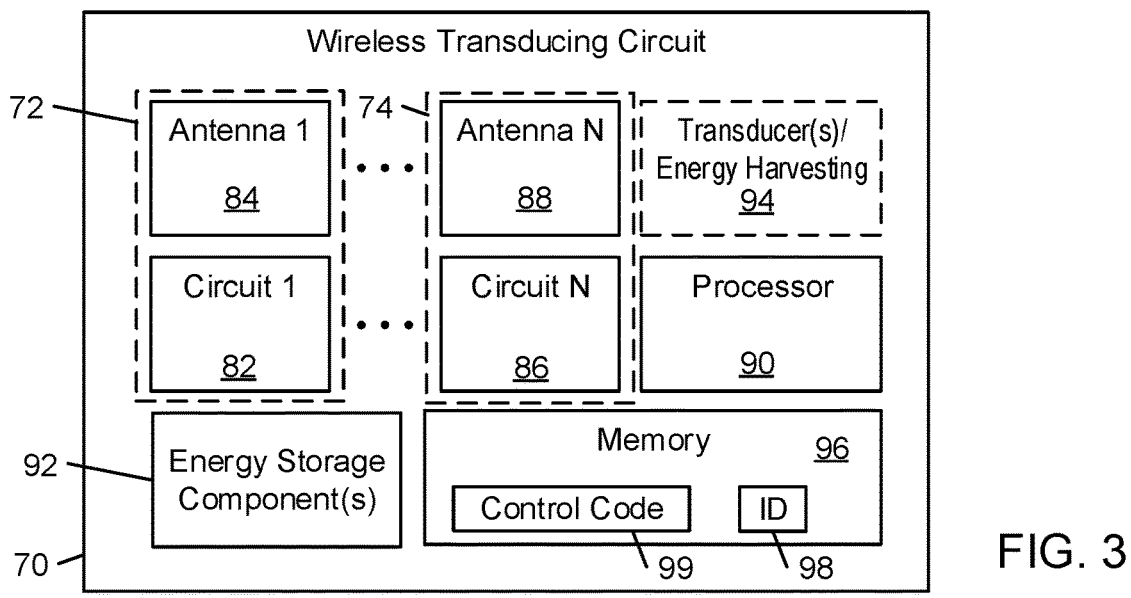
FIG. 3 is a schematic view of an example segment of an adhesive tape platform, according to some embodiments.

FIG. 3 shows a block diagram of the components of an example wireless transducing circuit 70 that includes a number of communication systems 72, 74. Example communication systems 72, 74 include a GPS system that includes a GPS receiver circuit 82 (e.g., a receiver integrated circuit) and a GPS antenna 84, and one or more wireless communication systems each of which includes a respective transceiver circuit 86 (e.g., a transceiver integrated circuit) and a respective antenna 88. Example wireless communication systems include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system. The wireless transducing circuit 70 also includes a processor 90 (e.g., a microcontroller or microprocessor), one or more energy storage devices 92 (e.g., non-rechargeable or rechargeable printed flexible battery, conventional single or multiple cell battery, and/or a super capacitor or charge pump), one or more transducers 94 (e.g., sensors and/or actuators, and, optionally, one or more energy harvesting transducer components). In some examples, the conventional single or multiple cell battery may be a watch style disk or button cell battery that is associated electrical connection apparatus (e.g., a metal clip) that electrically connects the electrodes of the battery to contact pads on the flexible circuit 116.

Examples of sensing transducers 94 include a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, and a humidity sensor. Examples of actuating (e.g., energy emitting) transducers 94 include light emitting components (e.g., light emitting diodes and displays), electro-acoustic transducers (e.g., audio speakers), electric motors, and thermal radiators (e.g., an electrical resistor or a thermoelectric cooler).

In some examples, the wireless transducing circuit 70 includes a memory 96 for storing data, including, e.g., profile data, state data, event data, sensor data, localization data, security data, and one or more unique identifiers (ID) 98 associated with the wireless transducing circuit 70, such as a product ID, a type ID, and a media access control (MAC) ID, and control code 99. In some examples, the memory 96 may be incorporated into one or more of the processor 90 or transducers 94, or may be a separate component that is integrated in the wireless transducing circuit 70 as shown in FIG. 3. The control code typically is implemented as programmatic functions or program modules that control the operation of the wireless transducing circuit 70, including a tape node communication manager that manages the manner and timing of tape node communications, a tape node power manager that manages power consumption, and a tape node connection manager that controls whether connections with other tape nodes are secure connections or unsecure connections, and a tape node storage manager that securely manages the local data storage on the node. The tape node connection manager ensures the level of security required by the end application and supports various encryption mechanisms. The tape node power manager and tape communication manager work together to optimize the battery consumption for data communication. In some examples, execution of the control code by the different types of tape nodes described herein may result in the performance of similar or different functions.

Figure 4:
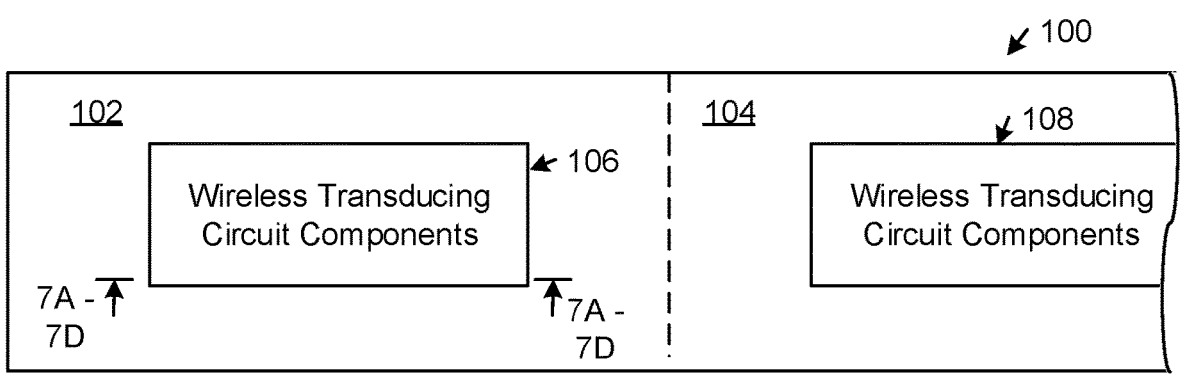
FIG. 4 is a diagrammatic top view of a length of an example adhesive tape platform, according to some embodiments.

FIG. 4 is a top view of a portion of an example flexible adhesive tape platform 100 that shows a first segment 102 and a portion of a second segment 104. Each segment 102, 104 of the flexible adhesive tape platform 100 includes a respective set 106, 108 of the components of the wireless transducing circuit 70. The segments 102, 104 and their respective sets of components 106, 108 typically are identical and configured in the same way. In some other embodiments, however, the segments 102, 104 and/or their respective sets of components 106, 108 are different and/or configured in different ways. For example, in some examples, different sets of the segments of the flexible adhesive tape platform 100 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

An example method of fabricating the adhesive tape platform 100 (see FIG. 4) according to a roll-to-roll fabrication process is described in connection with FIGS. 6, 7A, and 7B of U.S. Pat. No. 10,262,255, issued Apr. 16, 2019, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

Figure 5A:
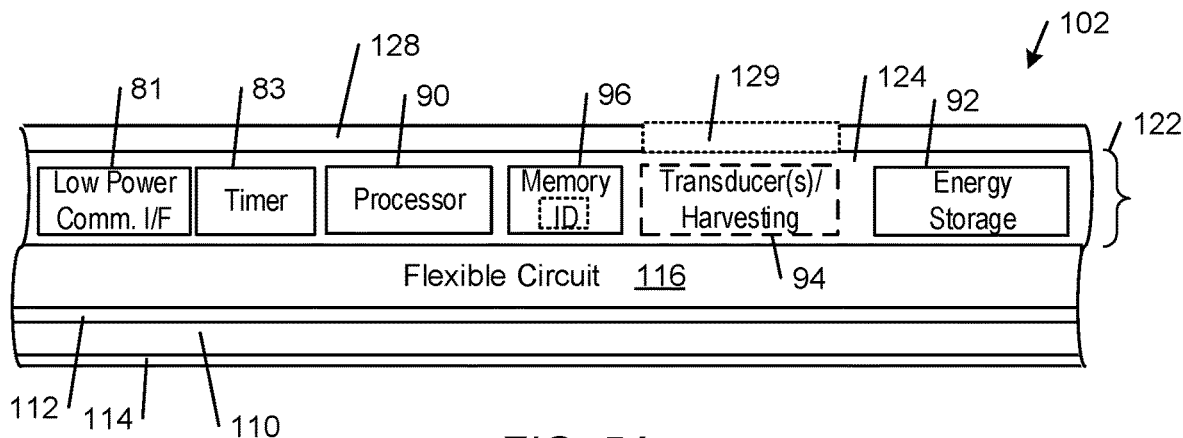
FIGS. 5A-5C show diagrammatic cross-sectional side views of portions of different respective adhesive tape platforms, according to some embodiments.

FIG. 5A shows a cross-sectional side view of a portion of an example segment 102 of the flexible adhesive tape platform 100 that includes a respective set of the components of the wireless transducing circuit 106 corresponding to the first tape node type (i.e., white). The flexible adhesive tape platform segment 102 includes an adhesive layer 112, an optional flexible substrate 110, and an optional adhesive layer 114 on the bottom surface of the flexible substrate 110. If the bottom adhesive layer 114 is present, a release liner (not shown) may be (weakly) adhered to the bottom surface of the adhesive layer 114. In some examples, the adhesive layer 114 includes an adhesive (e.g., an acrylic foam adhesive) that has a high bond strength that is sufficient to prevent removal of the adhesive segment 102 from a surface on which the adhesive layer 114 is adhered without destroying the physical or mechanical integrity of the adhesive segment 102 and/or one or more of its constituent components. In some examples, the optional flexible substrate 110 is implemented as a prefabricated adhesive tape that includes the adhesive layers 112, 114 and the optional release liner. In other examples, the adhesive layers 112, 114 are applied to the top and bottom surfaces of the flexible substrate 110 during the fabrication of the adhesive tape platform 100. The adhesive layer 112 bonds the flexible substrate 110 to a bottom surface of a flexible circuit 116, that includes one or more wiring layers (not shown) that connect the processor 90, a low power wireless communication interface 81 (e.g., a Zigbee, Bluetooth® Low Energy (BLE) interface, or other low power communication interface), a timer circuit 83, transducing and/or energy harvesting component(s) 94 (if present), the memory 96, and other components in a device layer 122 to each other and to the energy storage component 92 and, thereby, enable the transducing, tracking and other functionalities of the flexible adhesive tape platform segment 102. The low power wireless communication interface 81 typically includes one or more of the antennas 84, 88 and one or more of the wireless circuits 82, 86.

Figure 5B:
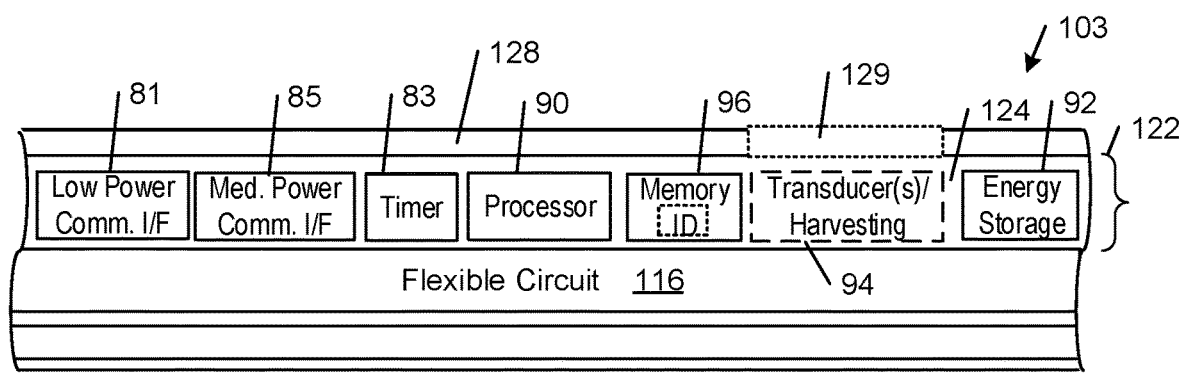

FIG. 5B shows a cross-sectional side view of a portion of an example segment 103 of the flexible adhesive tape platform 100 that includes a respective set of the components of the wireless transducing circuit 106 corresponding to the second tape node type (i.e., green). In this example, the flexible adhesive tape platform segment 103 differs from the segment 102 shown in FIG. 5A by the inclusion of a medium power communication interface 85 (e.g., a LoRa interface) in addition to the low power communications interface that is present in the first tape node type (i.e., white). The medium power communication interface has longer communication range than the low power communication interface. In some examples, one or more other components of the flexible adhesive tape platform segment 103 differ, for example, in functionality or capacity (e.g., larger energy source).

Figure 5C:
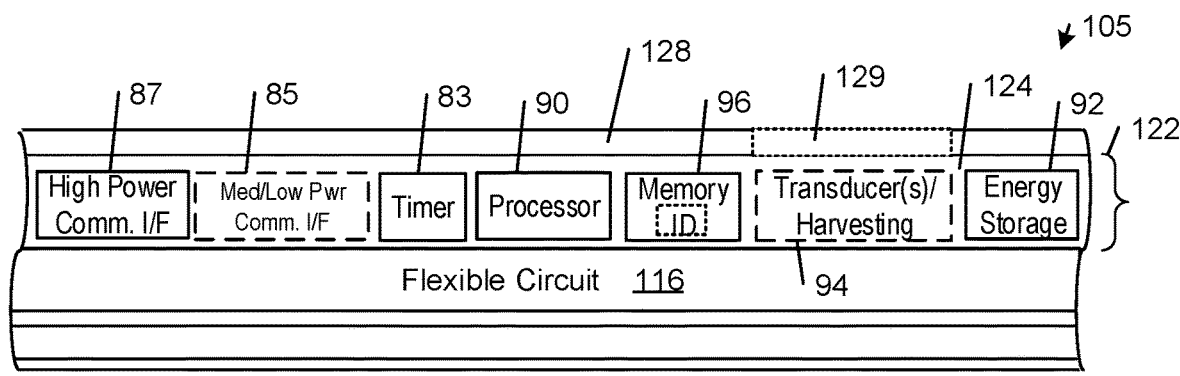

FIG. 5C shows a cross-sectional side view of a portion of an example segment 105 of the flexible adhesive tape platform 100 that includes a respective set of the components of the wireless transducing circuit 106 corresponding to the third tape node type (i.e., black). In this example, the flexible adhesive tape platform segment 105 includes a high power communications interface 87 (e.g., a cellular interface; e.g., GSM/GPRS) and an optional medium and/or low power communications interface 85. The high power communication range provides global coverage to available infrastructure (e.g. the cellular network). In some examples, one or more other components of the flexible adhesive tape platform segment 105 differ, for example, in functionality or capacity (e.g., larger energy source).

FIGS. 5A-5C show examples in which the cover layer 128 of the flexible adhesive tape platform 100 includes one or more interfacial regions 129 positioned over one or more of the transducers 94. In examples, one or more of the interfacial regions 129 have features, properties, compositions, dimensions, and/or characteristics that are designed to improve the operating performance of the platform 100 for specific applications. In some examples, the flexible adhesive tape platform 100 includes multiple interfacial regions 129 over respective transducers 94, which may be the same or different depending on the target applications. Example interfacial regions include an opening, an optically transparent window, and/or a membrane located in the interfacial region 129 of the cover 128 that is positioned over the one or more transducers and/or energy harvesting components 94. Additional details regarding the structure and operation of example interfacial regions 129 are described in U.S. Provisional Patent Application No. 62/680,716, filed Jun. 5, 2018, PCT Patent Application No. PCT/US2018/064919, filed Dec. 11, 2018, U.S. Pat. No. 10,885,420, issued Jan. 4, 2021, U.S. Pat. No. 10,902,310 issued Jan. 25, 2021, and U.S. Provisional Patent Application No. 62/670,712, filed May 11, 2018, all of which are incorporated herein in their entirety.

In some examples, a flexible polymer layer 124 encapsulates the device layer 122 and thereby reduces the risk of damage that may result from the intrusion of contaminants and/or liquids (e.g., water) into the device layer 122. The flexible polymer layer 124 also planarizes the device layer 122. This facilitates optional stacking of additional layers on the device layer 122 and also distributes forces generated in, on, or across the adhesive tape platform segment 102 so as to reduce potentially damaging asymmetric stresses that might be caused by the application of bending, torqueing, pressing, or other forces that may be applied to the flexible adhesive tape platform segment 102 during use. In the illustrated example, a flexible cover 128 is bonded to the planarizing polymer 124 by an adhesive layer (not shown).

The flexible cover 128 and the flexible substrate 110 may have the same or different compositions depending on the intended application. In some examples, one or both of the flexible cover 128 and the flexible substrate 110 include flexible film layers and/or paper substrates, where the film layers may have reflective surfaces or reflective surface coatings. Example compositions for the flexible film layers include polymer films, such as polyester, polyimide, polyethylene terephthalate (PET), and other plastics. The optional adhesive layer on the bottom surface of the flexible cover 128 and the adhesive layers 112, 114 on the top and bottom surfaces of the flexible substrate 110 typically include a pressure-sensitive adhesive (e.g., a silicon-based adhesive). In some examples, the adhesive layers are applied to the flexible cover 128 and the flexible substrate 110 during manufacture of the adhesive tape platform 100 (e.g., during a roll-to-roll or sheet-to-sheet fabrication process). In other examples, the flexible cover 128 may be implemented by a prefabricated single-sided pressure-sensitive adhesive tape and the flexible substrate 110 may be implemented by a prefabricated double-sided pressure-sensitive adhesive tape; both kinds of tape may be readily incorporated into a roll-to-roll or sheet-to-sheet fabrication process. In some examples, the flexible polymer layer 124 is composed of a flexible epoxy (e.g., silicone).

In some examples, the energy storage device 92 is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low power wireless communication interface 81 and/or the processor(s) 90 may be integrated on the flexible battery substrate. In some examples, one or more of such components also (e.g., the flexible antennas and the flexible interconnect circuits) may be printed on the flexible battery substrate.

In some examples, the flexible circuit 116 is formed on a flexible substrate by printing, etching, or laminating circuit patterns on the flexible substrate. In some examples, the flexible circuit 116 is implemented by one or more of a single-sided flex circuit, a double access or back bared flex circuit, a sculpted flex circuit, a double-sided flex circuit, a multi-layer flex circuit, a rigid flex circuit, and a polymer thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example flexible adhesive tape platform segments 102 shown in FIGS. 5A-5C, the flexible circuit 116 is a single access flex circuit that interconnects the components of the adhesive tape platform on a single side of the flexible circuit 116. In other examples, the flexible circuit 116 is a double access flex circuit that includes a front-side conductive pattern that interconnects the low power communications interface 81, the timer circuit 83, the processor 90, the one or more transducers 94 (if present), and the memory 96, and allows through-hole access (not shown) to a back-side conductive pattern that is connected to the flexible battery (not shown). In these examples, the front-side conductive pattern of the flexible circuit 116 connects the communications circuits 82, 86 (e.g., receivers, transmitters, and transceivers) to their respective antennas 84, 88 and to the processor 90, and also connects the processor 90 to the one or more sensors 94 and the memory 96. The backside conductive pattern connects the active electronics (e.g., the processor 90, the communications circuits 82, 86, and the transducers) on the front-side of the flexible circuit 116 to the electrodes of the flexible battery 116 via one or more through holes in the substrate of the flexible circuit 116.

Depending on the target application, the wireless transducing circuits 70 are distributed across the flexible adhesive tape platform 100 according to a specified sampling density, which is the number of wireless transducing circuits 70 for a given unit size (e.g., length or area) of the flexible adhesive tape platform 100. In some examples, a set of multiple flexible adhesive tape platforms 100 are provided that include different respective sampling densities in order to seal different asset sizes with a desired number of wireless transducing circuits 70. In particular, the number of wireless transducing circuits per asset size is given by the product of the sampling density specified for the adhesive tape platform and the respective size of the adhesive tape platform 100 needed to seal the asset. This allows an automated packaging system to select the appropriate type of flexible adhesive tape platform 100 to use for sealing a given asset with the desired redundancy (if any) in the number of wireless transducer circuits 70. In some example applications (e.g., shipping low value goods), only one wireless transducing circuit 70 is used per asset, whereas in other applications (e.g., shipping high value goods) multiple wireless transducing circuits 70 are used per asset. Thus, a flexible adhesive tape platform 100 with a lower sampling density of wireless transducing circuits 70 can be used for the former application, and a flexible adhesive tape platform 100 with a higher sampling density of wireless transducing circuits 70 can be used for the latter application. In some examples, the flexible adhesive tape platforms 100 are color-coded or otherwise marked to indicate the respective sampling densities with which the wireless transducing circuits 70 are distributed across the different types of adhesive tape platforms 100.

The components of the flexible adhesive tape platform segments 102, 103, 105 shown in FIGS. 5A-5C may be arranged in different ways to accommodate different form factors, according to some embodiments.

Figure 6A:
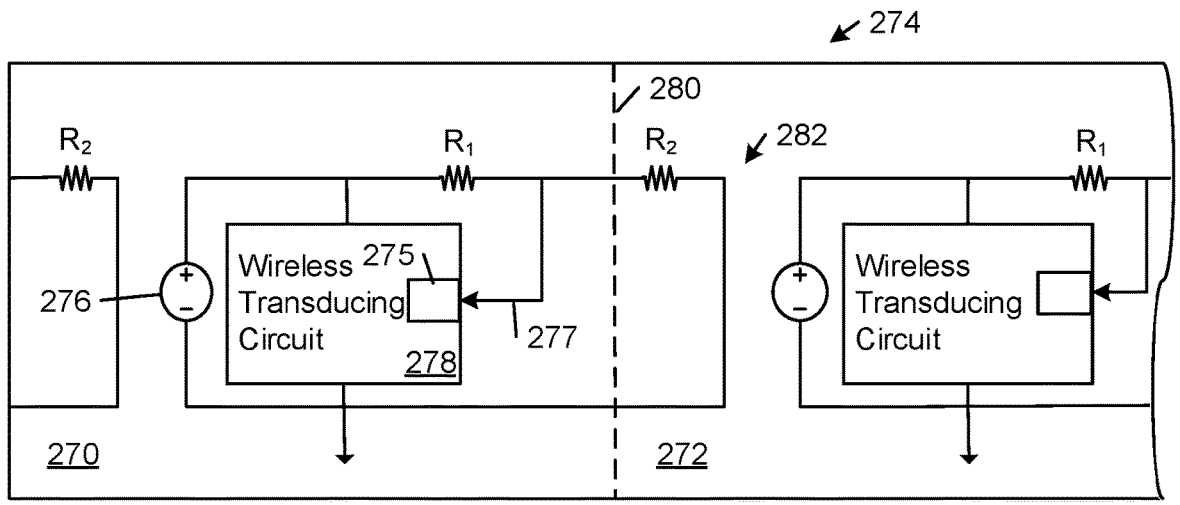
FIGS. 6A-6B are diagrammatic top views of a length of an example adhesive tape platform, according to some embodiments.

Referring to FIG. 6A, in some examples, each of one or more of the segments 270, 272 of a flexible adhesive tape platform 274 includes a respective one-time wake circuit 275 that delivers power from the respective energy source 276 to the respective wireless circuit 278 (e.g., a processor, one or more transducers, and one or more wireless communications circuits) in response to an event. In some of these examples, the wake circuit 275 is configured to transition from an off state to an on state when the voltage on the wake node 277 exceeds a threshold level, at which point the wake circuit transitions to an on state to power-on the segment 270. In the illustrated example, this occurs when the user separates the segment from the adhesive tape platform 274, for example, by cutting across the adhesive tape platform 274 at a designated location (e.g., along a designated cut-line 280). In particular, in its initial, un-cut state, a minimal amount of current flows through the resistors R1 and R2. As a result, the voltage on the wake node 277 remains below the threshold turn-on level. After the user cuts across the adhesive tape platform 274 along the designated cut-line 280, the user creates an open circuit in the loop 282, which pulls the voltage of the wake node above the threshold level and turns on the wake circuit 275. As a result, the voltage across the energy source 276 will appear across the wireless circuit 278 and, thereby, turn on the segment 270. In particular embodiments, the resistance value of resistor R1 is greater than the resistance value of R2. In some examples, the resistance values of resistors R1 and R2 are selected based on the overall design of the adhesive product system (e.g., the target wake voltage level and a target leakage current).

In some examples, each of one or more of the segments of an adhesive tape platform includes a respective sensor and a respective wake circuit that delivers power from the respective energy source to the respective one or more of the respective wireless circuit components 278 in response to an output of the sensor. In some examples, the respective sensor is a strain sensor that produces a wake signal based on a change in strain in the respective segment. In some of these examples, the strain sensor is affixed to a adhesive tape platform and configured to detect the stretching of the tracking adhesive tape platform segment as the segment is being peeled off a roll or a sheet of the adhesive tape platform. In some examples, the respective sensor is a capacitive sensor that produces a wake signal based on a change in capacitance in the respective segment. In some of these examples, the capacitive sensor is affixed to an adhesive tape platform and configured to detect the separation of the tracking adhesive tape platform segment from a roll or a sheet of the adhesive tape platform. In some examples, the respective sensor is a flex sensor that produces a wake signal based on a change in curvature in the respective segment. In some of these examples, the flex sensor is affixed to a adhesive tape platform and configured to detect bending of the tracking adhesive tape platform segment as the segment is being peeled off a roll or a sheet of the adhesive tape platform. In some examples, the respective sensor is a near field communications sensor that produces a wake signal based on a change in inductance in the respective segment.

Figure 6B:
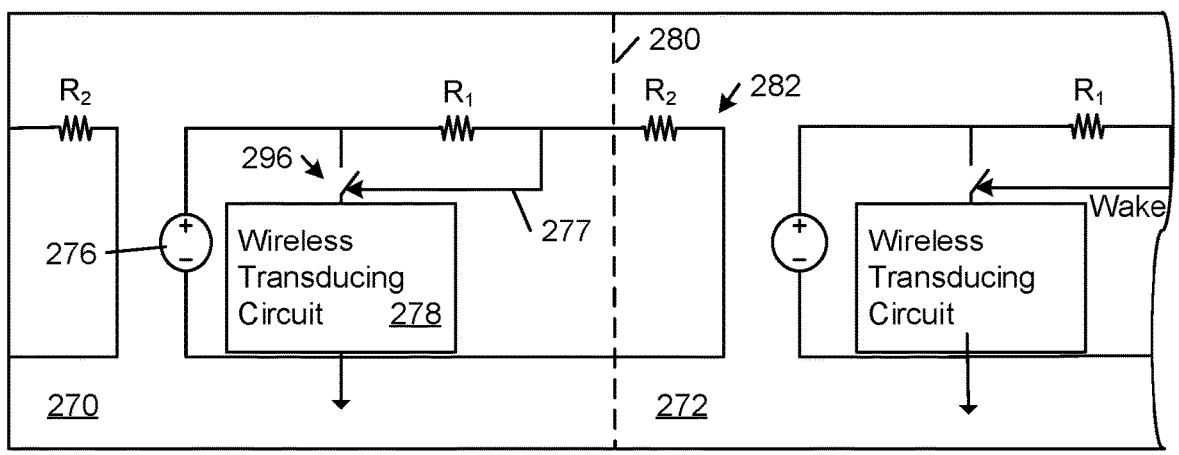

FIG. 6B shows another example of an adhesive tape platform 294 that delivers power from the respective energy source 276 to the respective tracking circuit 278 (e.g., a processor, one or more transducers, and one or more wireless communications circuits) in response to an event. This example is similar in structure and operation as the adhesive tape platform 294 shown in FIG. 6A, except that the wake circuit 275 is implemented by a switch 296 that is configured to transition from an open state to a closed state when the voltage on the switch node 277 exceeds a threshold level. In the initial state of the adhesive tape platform 294, the voltage on the switch node is below the threshold level as a result of the low current level flowing through the resistors R1 and R2. After the user cuts across the adhesive tape platform 294 along the designated cut-line 280, the user creates an open circuit in the loop 282, which pulls up the voltage on the switch node above the threshold level to close the switch 296 and turn on the wireless circuit 278.

Figure 6C:
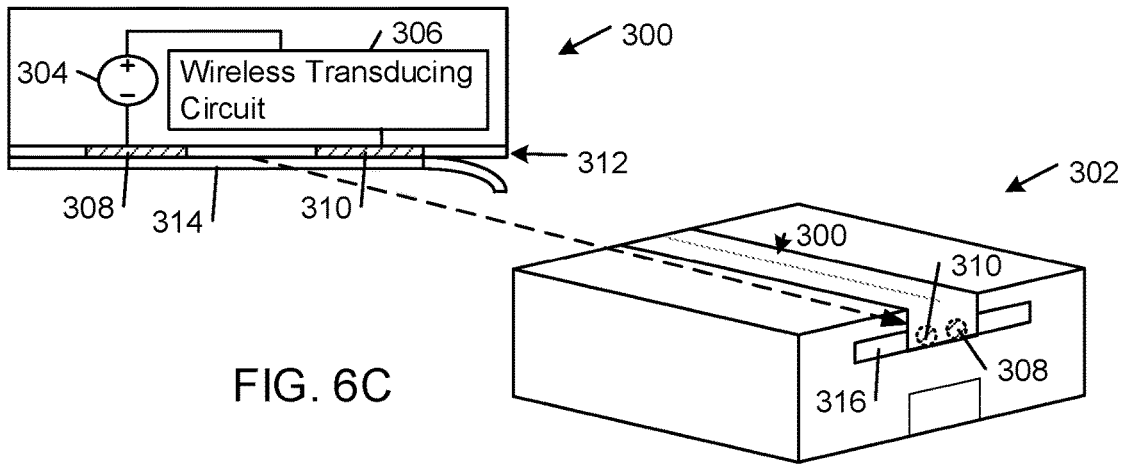
FIG. 6C is a diagrammatic view of a length of an example adhesive tape platform adhered to an asset, according to some embodiments.

FIG. 6C shows a diagrammatic cross-sectional front view of an example adhesive tape platform 300 and a perspective view of an example asset 302. Instead of activating the adhesive tape platform in response to separating a segment of the adhesive tape platform from a roll or a sheet of the adhesive tape platform, this example is configured to supply power from the energy source 302 to turn on the wireless transducing circuit 306 in response to establishing an electrical connection between two power terminals 308, 310 that are integrated into the adhesive tape platform. In particular, each segment of the adhesive tape platform 300 includes a respective set of embedded tracking components, an adhesive layer 312, and an optional backing sheet 314 with a release coating that prevents the segments from adhering strongly to the backing sheet 314. In some examples, the power terminals 308, 310 are composed of an electrically conductive material (e.g., a metal, such as copper) that may be printed or otherwise patterned and/or deposited on the backside of the adhesive tape platform 300. In operation, the adhesive tape platform can be activated by removing the backing sheet 314 and applying the exposed adhesive layer 312 to a surface that includes an electrically conductive region 316. In the illustrated embodiment, the electrically conductive region 316 is disposed on a portion of the asset 302. When the adhesive backside of the adhesive tape platform 300 is adhered to the asset with the exposed terminals 308, 310 aligned and in contact with the electrically conductive region 316 on the asset 302, an electrical connection is created through the electrically conductive region 316 between the exposed terminals 308, 310 that completes the circuit and turns on the wireless transducing circuit 306. In particular embodiments, the power terminals 308, 310 are electrically connected to any respective nodes of the wireless transducing circuit 306 that would result in the activation of the tracking circuit 306 in response to the creation of an electrical connection between the power terminals 308, 310.

In some examples, after a tape node is turned on, it will communicate with the network service to confirm that the user/operator who is associated with the tape node is an authorized user who has authenticated himself or herself to the network service 54. In these examples, if the tape node cannot confirm that the user/operator is an authorized user, the tape node will turn itself off.

Deployment of Tape Nodes

Figure 7:
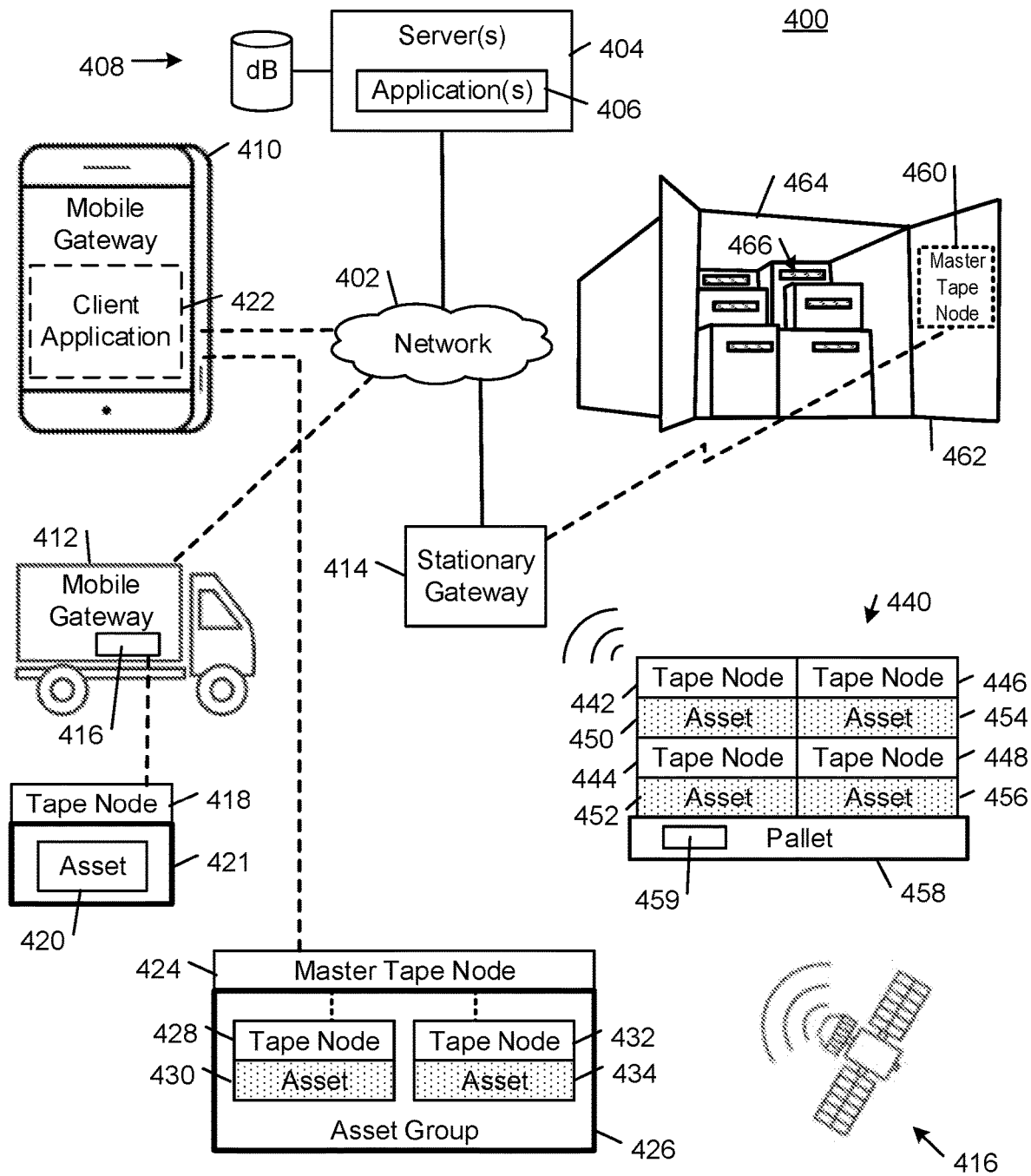
FIG. 7 is a diagrammatic view of an example of a network environment supporting communications with segments of an adhesive tape platform, according to some embodiments.

FIG. 7 shows an example network communications environment 400 (also referred to herein as an "IOT system" 400) that includes a network 402 that supports communications between one or more servers 404 executing one or more applications of a network service 408, mobile gateways 410, 412, a stationary gateway 414, and various types of tape nodes that are associated with various assets (e.g., parcels, equipment, tools, persons, and other things). Each member of the IOT system 400 may be referred to as a node of the IOT system 400, including the tape nodes, other wireless IOT devices, gateways (stationary and mobile), client devices, and servers. In some examples, the network 402 includes one or more network communication systems and technologies, including any one or more of wide area networks, local area networks, public networks (e.g., the internet), private networks (e.g., intranets and extranets), wired networks, and wireless networks. For example, the network 402 includes communications infrastructure equipment, such as a geolocation satellite system 416 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications 406 leverage the above-mentioned communications technologies to create a hierarchical wireless network of tape nodes that improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link the communication uses the infrastructure security mechanisms. In case of communications among tapes nodes, the communication is secured through a custom security mechanism. In certain cases, tape nodes can also be configured to support block chain to protect the transmitted and stored data.

A set of tape nodes can be configured by the network service 408 to create hierarchical communications network. The hierarchy can be defined in terms of one or more factors, including functionality (e.g., wireless transmission range or power), role (e.g., master tape node vs. peripheral tape node), or cost (e.g., a tape node equipped with a cellular transceiver vs. a peripheral tape node equipped with a Bluetooth LE transceiver). Tape nodes can be assigned to different levels of a hierarchical network according to one or more of the above-mentioned factors. For example, the hierarchy can be defined in terms of communication range or power, where tape nodes with higher power or longer communication range transceivers are arranged at a higher level of the hierarchy than tape nodes with lower power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure can be formulated as an optimization problem with battery capacity of nodes, power consumption in various modes of operation, desired latency, external environment, etc. and can be solved using modern optimization methods e.g. neural networks, artificial intelligence, and other machine learning computing systems that take expected and historical data to create an optimal solution and can create algorithms for modifying the system's behavior adaptively in the field.

The tape nodes may be deployed by automated equipment or manually. In this process, a tape node typically is separated from a roll or sheet and adhered to a asset, or other stationary or mobile object (e.g., a structural element of a warehouse, or a vehicle, such as a delivery truck) or stationary object (e.g., a structural element of a building). This process activates the tape node and causes the tape node to communicate with a server 404 of the network service 408. In this process, the tape node may communicate through one or more other tape nodes in the communication hierarchy. In this process, the network server 404 executes the network service application 406 to programmatically configure tape nodes that are deployed in the environment 400. In some examples, there are multiple classes or types of tape nodes, where each tape node class has a different respective set of functionalities and/or capacities.

In some examples, the one or more network service servers 404 communicate over the network 402 with one or more gateways that are configured to send, transmit, forward, or relay messages to the network 402 and activated tape nodes that are associated with respective assets and within communication range. Example gateways include mobile gateways 410, 412 and a stationary gateway 414. In some examples, the mobile gateways 410, 412, and the stationary gateway 414 are able to communicate with the network 402 and with designated sets or groups of tape nodes.

In some examples, the mobile gateway 412 is a vehicle (e.g., a delivery truck or other mobile hub) that includes a wireless communications unit 416 that is configured by the network service 408 to communicate with a designated set of tape nodes, including a peripheral tape node 418 in the form of a label that is adhered to an asset 420 contained within a parcel 421 (e.g., an envelope), and is further configured to communicate with the network service 408 over the network 402. In some examples, the peripheral tape node 418 includes a lower power wireless communications interface of the type used in, e.g., tape node 102 (shown in FIG. 5A), and the wireless communications unit 416 is implemented by a tape node (e.g., one of tape node 103 or tape node 105, respectively shown in FIGS. 5B and 5C) that includes a lower power communications interface for communicating with tape nodes within range of the mobile gateway 412 and a higher power communications interface for communicating with the network 402. In this way, the tape nodes 418 and 416 create a hierarchical wireless network of nodes for transmitting, forwarding, bridging, relaying, or otherwise communicating wireless messages to, between, or on behalf of the peripheral tape node 418 and the network service 408 in a power-efficient and cost-effective way.

In some examples, the mobile gateway 410 is a mobile phone that is operated by a human operator and executes a client application 422 that is configured by the network service 408 to communicate with a designated set of tape nodes, including a master tape node 424 that is adhered to a parcel 426 (e.g., a box), and is further configured to communicate with the network service 408 over the network 402. In the illustrated example, the parcel 426 contains a first parcel labeled or sealed by a tape node 428 and containing a first asset 430, and a second parcel labeled or sealed by a tape node 432 and containing a second asset 434. As explained in detail below, the master tape node 424 communicates with each of the peripheral tape nodes 428, 432 and communicates with the mobile gateway 408 in accordance with a hierarchical wireless network of tape nodes. In some examples, each of the peripheral tape nodes 428, 432 includes a lower power wireless communications interface of the type used in, e.g., tape node 102 (shown in FIG. 5A), and the master tape node 424 is implemented by a tape node (e.g., tape node 103, shown in FIG. 5B) that includes a lower power communications interface for communicating with the peripheral tape nodes 428, 432 contained within the parcel 426, and a higher power communications interface for communicating with the mobile gateway 410. The master tape node 424 is operable to relay wireless communications between the tape nodes 428, 432 contained within the parcel 426 and the mobile gateway 410, and the mobile gateway 410 is operable to relay wireless communications between the master tape node 424 and the network service 408 over the wireless network 402. In this way, the master tape node 424 and the peripheral tape nodes 428 and 432 create a hierarchical wireless network of nodes for transmitting, forwarding, relaying, or otherwise communicating wireless messages to, between, or on behalf of the peripheral tape nodes 428, 432 and the network service 408 in a power-efficient and cost-effective way.

In some examples, the stationary gateway 414 is implemented by a server executing a server application that is configured by the network service 408 to communicate with a designated set 440 of tape nodes 442, 444, 446, 448 that are adhered to respective parcels containing respective assets 450, 452, 454, 456 on a pallet 458. In other examples, the stationary gateway 414 is implemented by a tape node (e.g., one of tape node 103 or tape node 105, respectively shown in FIGS. 5B and 5C) that is adhered to, for example, a wall, column or other infrastructure component of the environment 400, and includes a lower power communications interface for communicating with tape nodes within range of the stationary gateway 414 and a higher power communications interface for communicating with the network 402. In one embodiment, each of the tape nodes 442-448 is a peripheral tape node and is configured by the network service 408 to communicate individually with the stationary gateway 414, which relays communications from the tape nodes 442-448 to the network service 408 through the stationary gateway 414 and over the communications network 402. In another embodiment, one of the tape nodes 442-448 at a time is configured as a master tape node that transmits, forwards, relays, or otherwise communicate wireless messages to, between, or on behalf of the other tape nodes on the pallet 458. In this embodiment, the master tape node may be determined by the tape nodes 442-448 or designated by the network service 408. In some examples, the tape node with the longest range or highest remaining power level is determined to be the master tape node. In some examples, when the power level of the current master tape node drops below a certain level (e.g., a fixed power threshold level or a threshold level relative to the power levels of one or more of the other tape nodes), another one of the tape nodes assumes the role of the master tape node. In some examples, a master tape node 459 is adhered to the pallet 458 and is configured to perform the role of a master node for the tape nodes 442-448. In these ways, the tape nodes 442-448, 458 are configurable to create different hierarchical wireless networks of nodes for transmitting, forwarding, relaying, bridging, or otherwise communicating wireless messages with the network service 408 through the stationary gateway 414 and over the network 402 in a power-efficient and cost-effective way.

In the illustrated example, the stationary gateway 414 also is configured by the network service 408 to communicate with a designated set of tape nodes, including a master tape node 460 that is adhered to the inside of a door 462 of a shipping container 464, and is further configured to communicate with the network service 408 over the network 402. In the illustrated example, the shipping container 464 contains a number of parcels labeled or sealed by respective peripheral tape nodes 466 and containing respective assets. The master tape node 416 communicates with each of the peripheral tape nodes 466 and communicates with the stationary gateway 415 in accordance with a hierarchical wireless network of tape nodes. In some examples, each of the peripheral tape nodes 466 includes a lower power wireless communications interface of the type used in, e.g., tape node 102 (shown in FIG. 5A), and the master tape node 460 is implemented by a tape node (e.g., tape node 103, shown in FIG. 5B) that includes a lower power communications interface for communicating with the peripheral tape nodes 466 contained within the shipping container 464, and a higher power communications interface for communicating with the stationary gateway 414.

In some examples, when the doors of the shipping container 464 are closed, the master tape node 460 is operable to communicate wirelessly with the peripheral tape nodes 466 contained within the shipping container 464. In an example, the master tape node 460 is configured to collect sensor data from the peripheral tape nodes and, in some embodiments, process the collected data to generate, for example, one or more histograms from the collected data. When the doors of the shipping container 464 are open, the master tape node 460 is programmed to detect the door opening (e.g., with an accelerometer component of the master tape node 460) and, in addition to reporting the door opening event to the network service 408, the master tape node 460 is further programmed to transmit the collected data and/or the processed data in one or more wireless messages to the stationary gateway 414. The stationary gateway 414, in turn, is operable to transmit the wireless messages received from the master tape node 460 to the network service 408 over the wireless network 402. Alternatively, in some examples, the stationary gateway 414 also is operable to perform operations on the data received from the master tape node 460 with the same type of data produced by the master node 459 based on sensor data collected from the tape nodes 442-448. In this way, the master tape node 460 and the peripheral tape nodes 466 create a hierarchical wireless network of nodes for transmitting, forwarding, relaying, or otherwise communicating wireless messages to, between, or on behalf of the peripheral tape nodes 466 and the network service 408 in a power-efficient and cost-effective way.

In an example of the embodiment shown in FIG. 7, there are three classes of tape nodes: a short range tape node, a medium range tape node, and a long range tape node, as respectively shown in FIGS. 5A-5C. The short range tape nodes typically are adhered directly to parcels containing assets. In the illustrated example, the tape nodes 418, 428, 432, 442-448, 466 are short range tape nodes. The short range tape nodes typically communicate with a low power wireless communication protocol (e.g., Bluetooth LE, Zigbee, or Z-wave). The medium range tape nodes typically are adhered to objects (e.g., a box 426 and a shipping container 460) that are associated with multiple parcels that are separated from the medium range tape nodes by a barrier or a large distance. In the illustrated example, the tape nodes 424 and 460 are medium range tape nodes. The medium range tape nodes typically communicate with a medium power wireless communication protocol (e.g., LoRa or Wi-Fi). The long-range tape nodes typically are adhered to mobile or stationary infrastructure of the wireless communication environment 400. In the illustrated example, the mobile gateway tape node 412 and the stationary gateway tape node 414 are long range tape nodes. The long range tape nodes typically communicate with other nodes using a high power wireless communication protocol (e.g., a cellular data communication protocol). In some examples, the mobile gateway tape node 436 is adhered to a mobile vehicle (e.g., a truck). In these examples, the mobile gateway 412 may be moved to different locations in the environment 400 to assist in connecting other tape nodes to the server 404. In some examples, the stationary gateway tape node 414 may be attached to a stationary structure (e.g., a wall) in the environment 400 with a known geographic location. In these examples, other tape nodes in the environment can determine their geographic location by querying the gateway tape node 414.

Wireless Communications Network

Figure 8:
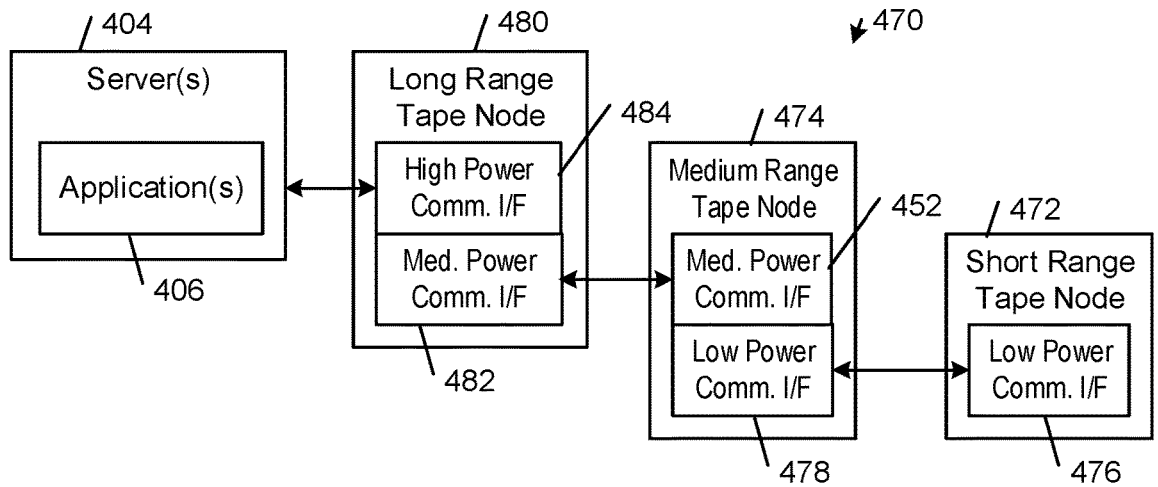
FIG. 8 is a diagrammatic view of a hierarchical communications network, according to some embodiments.

FIG. 8 shows an example hierarchical wireless communications network of tape nodes 470. In this example, the short range tape node 472 and the medium range tape node 474 communicate with one another over their respective low power wireless communication interfaces 476, 478. The medium range tape node 474 and the long range tape node 480 communicate with one another over their respective medium power wireless communication interfaces 478, 482. The long range tape node 480 and the network server 404 communicate with one another over the high power wireless communication interface 484. In some examples, the low power communication interfaces 476, 478 establish wireless communications with one another in accordance with the Bluetooth LE protocol, the medium power communication interfaces 452, 482 establish wireless communications with one another in accordance with the LoRa communications protocol, and the high power communication interface 484 establishes wireless communications with the server 404 in accordance with a cellular communications protocol.

In some examples, the different types of tape nodes are deployed at different levels in the communications hierarchy according to their respective communications ranges, with the long range tape nodes generally at the top of the hierarchy, the medium range tape nodes generally in the middle of the hierarchy, and the short range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, a server 404 of the network service 408 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more assets containing respective assets. In order to conserve power, the tape nodes typically communicate according to a schedule promulgated by the server 404 of the network service 408. The schedule usually dictates all aspects of the communication, including the times when particular tape nodes should communicate, the mode of communication, and the contents of the communication. In one example, the server 404 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server network node 404, either directly or indirectly through a gateway tape node (e.g., the long range tape node 416 adhered to the mobile vehicle 412 or the long range tape node 414 adhered to an infrastructure component of the environment 400). In other examples, the master tape node processes the information contained in the received data packets and transmits the processed information to the server network node 404.

Figure 9:
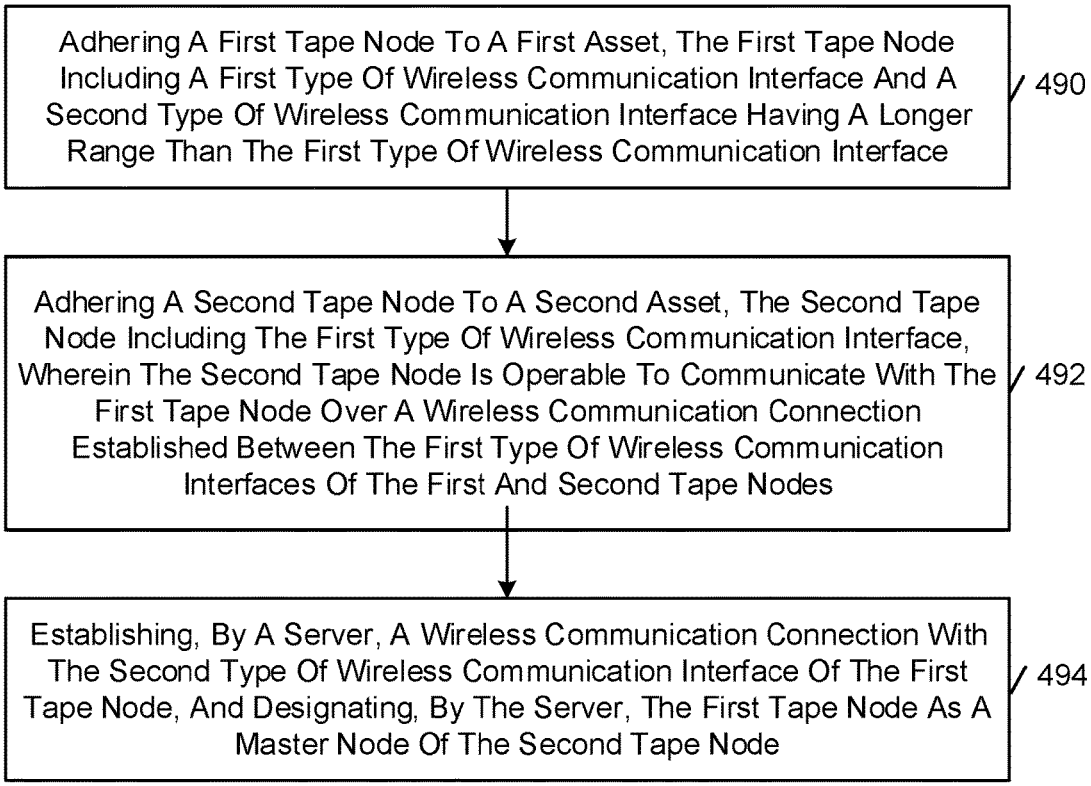
FIG. 9 is a flow diagram of a method of creating a hierarchical communications network, according to some embodiments.

FIG. 9 shows an example method of creating a hierarchical communications network. In accordance with this method, a first tape node is adhered to a first asset in a set of associated assets, the first tape node including a first type of wireless communication interface and a second type of wireless communication interface having a longer range than the first type of wireless communication interface (FIG. 9, block 490). A second tape node is adhered to a second asset in the set, the second tape node including the first type of wireless communication interface, wherein the second tape node is operable to communicate with the first tape node over a wireless communication connection established between the first type of wireless communication interfaces of the first and second tape nodes (FIG. 9, block 492). An application executing on a computer system (e.g., a server 404 of a network service 408) establishes a wireless communication connection with the second type of wireless communication interface of the first tape node, and the application transmits programmatic code executable by the first tape node to function as a master tape node with respect to the second tape node (FIG. 9, block 494).

In other embodiments, the second tape node is assigned the role of the master node of the first tape node.

Distributed Agent Operating System

As used herein, the term "node" refers to both a tape node and a non-tape node (i.e., a node or wireless device that is not an adhesive tape platform) unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node may be assigned a respective unique identifier, according to some embodiments.

The following disclosure describes a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs).

In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces). A node's mission (or objective) is defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services define the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server.

Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower power level, temperature reading, send an alert to local hub, send location data, triangulate location, any boxes in same group that already completed group objectives.

Nodes can be associated with items. Examples of an item includes, but are not limited to for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the items.

Communication paths between tape and/or non-tape nodes may be represented by a graph of edges between the corresponding assets (e.g., a storage unit, truck, or hub). In some embodiments, each node in the graph has a unique identifier. A set of connected edges between nodes is represented by a sequence of the node identifiers that defines a communication path between a set of nodes.

Figure 10A:
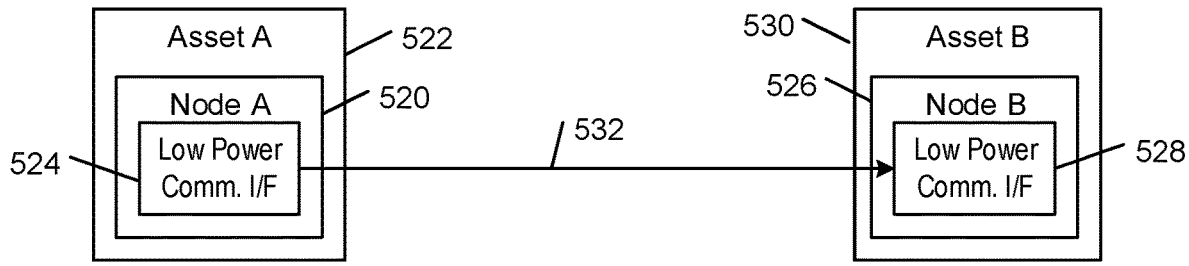
FIGS. 10A-10E are diagrammatic views of exemplary use cases for a distributed agent operating system, according to some embodiments.

Referring to FIG. 10A, a node 520 (Node A) is associated with an asset 522 (Asset A). In some embodiments, the node 520 may be implemented as a tape node that is used to seal the asset 522 or it may be implemented as a label node that is used to label the asset 522; alternatively, the node 520 may be implemented as a non-tape node that is inserted within the asset 522 or embedded in or otherwise attached to the interior or exterior of the asset 522. In the illustrated embodiment, the node 520 includes a low power communications interface 524 (e.g., a Bluetooth Low Energy communications interface). Another node 526 (Node B), which is associated with another asset 530 (Asset B), is similarly equipped with a compatible low power communications interface 528 (e.g., a Bluetooth Low Energy communications interface).

In an example scenario, in accordance with the programmatic code stored in its memory, node 526 (Node B) requires a connection to node 520 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 520 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 532 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 10B:
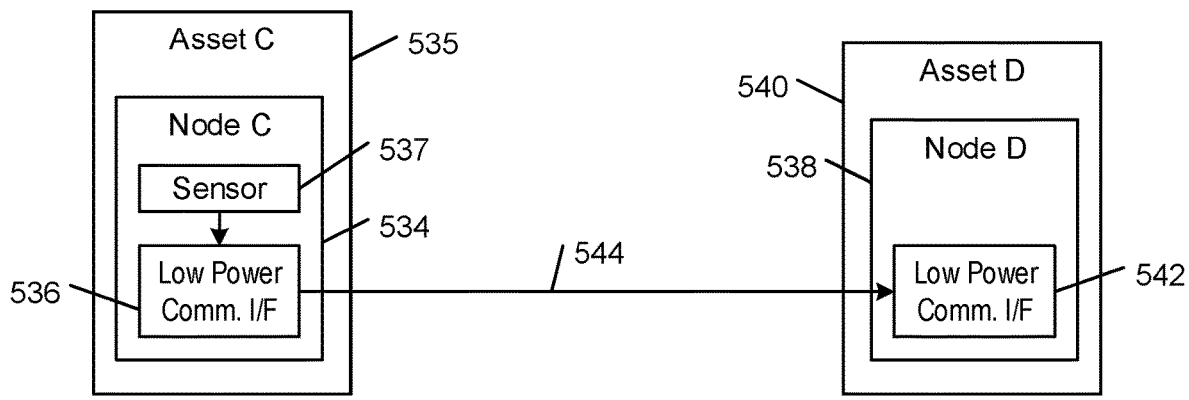

Referring to FIG. 10B, a node 534 (Node C) is associated with an asset 535 (Asset C). In the illustrated embodiment, the Node C includes a low power communications interface 536 (e.g., a Bluetooth Low Energy communications interface), and a sensor 537 (e.g., a temperature sensor). Another node 538 (Node D), which is associated with another asset 540 (Asset D), is similarly equipped with a compatible low power communications interface 542 (e.g., a Bluetooth Low Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D. In this process, Node C and Node D determine each other's identities, capabilities, and services. For example, after successfully establishing a communication path 544 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 10C:
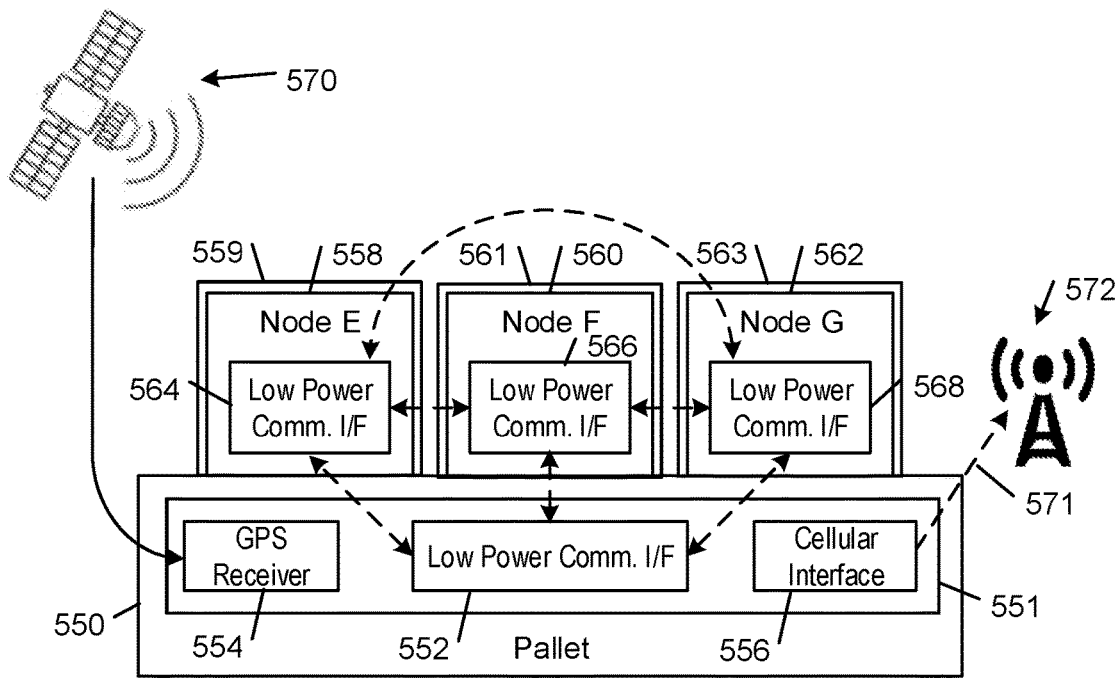

Referring to FIG. 10C, a pallet 550 is associated with a master node 551 that includes a low power communications interface 552, a GPS receiver 554, and a cellular communications interface 556. In some embodiments, the master node 551 may be implemented as a tape node or a label node that is adhered to the pallet 550. In other embodiments, the master node 551 may be implemented as a non-tape node that is inserted within the body of the pallet 550 or embedded in or otherwise attached to the interior or exterior of the pallet 550.

The pallet 550 provides a structure for grouping and containing assets 559, 561, 563 each of which is associated with a respective peripheral node 558, 560, 562 (Node E, Node F, and Node G). Each of the peripheral nodes 558, 560, 562 includes a respective low power communications interface 564, 566, 568 (e.g., Bluetooth Low Energy communications interface). In the illustrated embodiment, each of the nodes E, F, G and the master node 551 are connected to each of the other nodes over a respective low power communications path (shown by dashed lines).

In some embodiments, the assets 559, 561, 563 are grouped together because they are related. For example, the assets 559, 561, 563 may share the same shipping itinerary or a portion thereof. In an example scenario, the master pallet node 550 scans for advertising packets that are broadcasted from the peripheral nodes 558, 560, 562. In some examples, the peripheral nodes broadcast advertising packets during respective scheduled broadcast intervals. The master node 551 can determine the presence of the assets 559, 561, 563 in the vicinity of the pallet 550 based on receipt of one or more advertising packets from each of the nodes E, F, and G. In some embodiments, in response to receipt of advertising packets broadcasted by the peripheral nodes 558, 560, 562, the master node 551 transmits respective requests to the server to associate the master node 551 and the respective peripheral nodes 558, 560, 562. In some examples, the master tape node requests authorization from the server to associate the master tape node and the peripheral tape nodes. If the corresponding assets 559, 561, 563 are intended to be grouped together (e.g., they share the same itinerary or certain segments of the same itinerary), the server authorizes the master node 551 to associate the peripheral nodes 558, 560, 562 with one another as a grouped set of assets. In some embodiments, the server registers the master node and peripheral tape node identifiers with a group identifier. The server also may associate each node ID with a respective physical label ID that is affixed to the respective asset.

In some embodiments, after an initial set of assets is assigned to a multi-asset group, the master node 551 may identify another asset arrives in the vicinity of the multi-asset group. The master node may request authorization from the server to associate the other asset with the existing multi-asset group. If the server determines that the other asset is intended to ship with the multi-asset group, the server instructs the master node to merge one or more other assets with currently grouped set of assets. After all assets are grouped together, the server authorizes the multi-asset group to ship. In some embodiments, this process may involve releasing the multi-asset group from a containment area (e.g., customs holding area) in a shipment facility.

In some embodiments, the peripheral nodes 558, 560, 562 include environmental sensors for obtaining information regarding environmental conditions in the vicinity of the associated assets 559, 561, 563. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 551 can determine its own location based on geolocation data transmitted by a satellite-based radio navigation system 570 (e.g., GPS, GLONASS, and NAVSTAR) and received by the GPS receiver 554 component of the master node 551. In an alternative embodiment, the location of the master pallet node 551 can be determined using cellular based navigation techniques that use mobile communication technologies (e.g., GSM, GPRS, CDMA, etc.) to implement one or more cell-based localization techniques. After the master node 551 has ascertained its location, the distance of each of the assets 559, 561, 563 from the master node 551 can be estimated based on the average signal strength of the advertising packets that the master node 551 receives from the respective peripheral node. The master node 551 can then transmit its own location and the locations of the asset nodes E, F, and G to a server over a cellular interface connection with a cell tower 572. Other methods of determining the distance of each of the assets 559, 561, 563 from the master node 551, such as Received Signal-Strength Index (RSSI) based indoor localization techniques, also may be used.

In some embodiments, after determining its own location and the locations of the peripheral nodes, the master node 551 reports the location data and the collected and optionally processed (e.g., either by the peripheral nodes peripheral nodes 558, 560, 562 or the master node 551) sensor data to a server over a cellular communication path 571 on a cellular network 572.

In some examples, nodes are able to autonomously detect logistics execution errors if assets that suppose to travel together no longer travel together, and raise an alert. For example, a node (e.g., the master node 551 or one of the peripheral nodes 558, 560, 562) alerts the server when the node determines that a particular asset 559 is being or has already been improperly separated from the group of assets. The node may determine that there has been an improper separation of the particular asset 559 in a variety of ways. For example, the associated node 558 that is bound to the particular asset 559 may include an accelerometer that generates a signal in response to movement of the asset from the pallet. In accordance with its intelligent agent program code, the associated node 558 determines that the master node 551 has not disassociated the particular asset 559 from the group and therefore broadcasts advertising packets to the master node, which causes the master node 551 to monitor the average signal strength of the advertising packets and, if the master node 551 determines that the signal strength is decreasing over time, the master node 551 will issue an alert either locally (e.g., through a speaker component of the master node 551) or to the server.

Figure 10D:
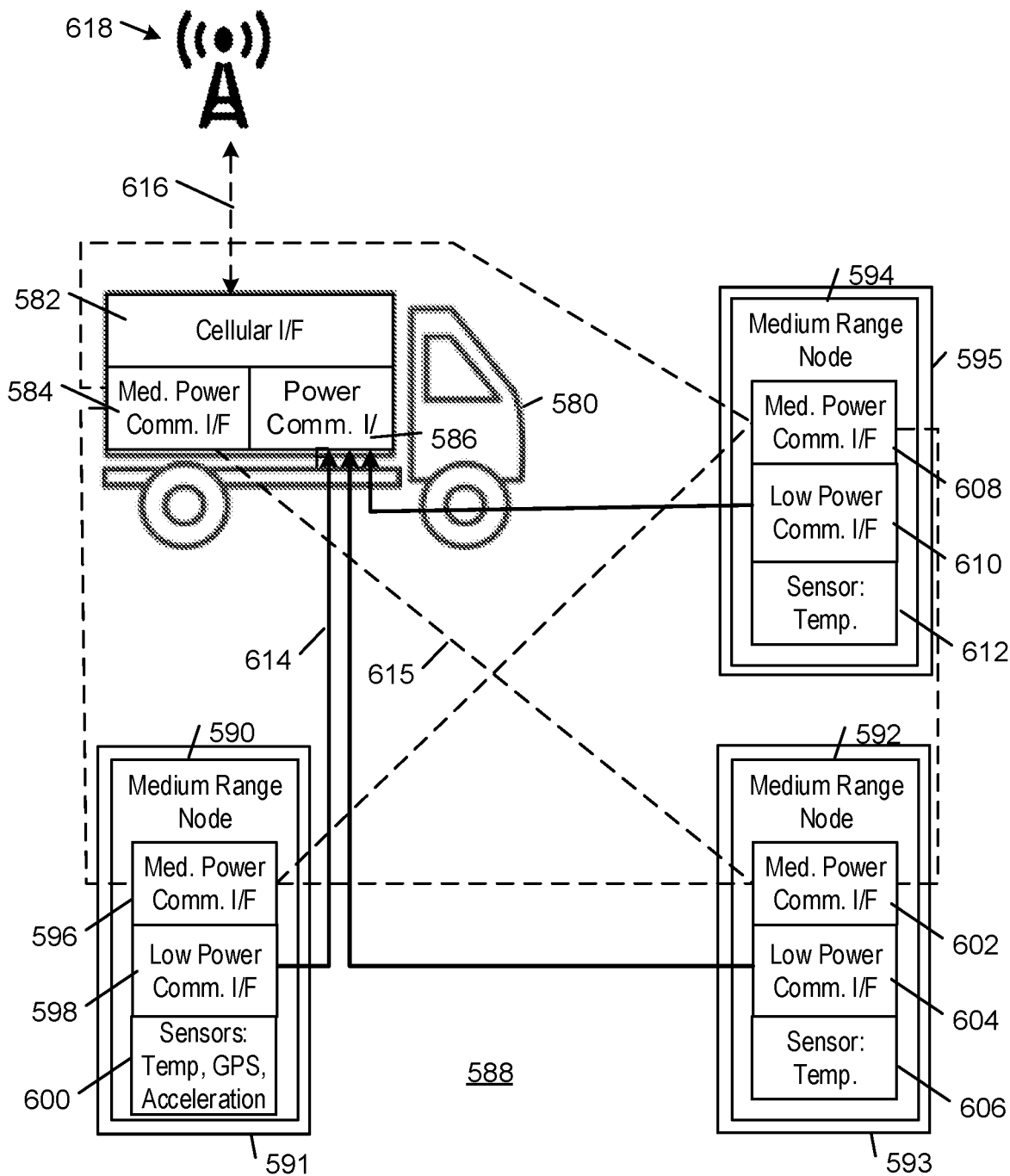

Referring to FIG. 10D, a truck 580 is configured as a mobile node or mobile hub that includes a cellular communications interface 582, a medium power communications interface 584, and a low power communications interface 586. The communications interfaces 580-586 may be implemented on one or more tape and non-tape nodes. In an illustrative scenario, the truck 580 visits a storage facility, such as a warehouse 588, to wirelessly obtain temperature data generated by temperature sensors in the medium range nodes 590, 592, 594. The warehouse 588 contains nodes 590, 592, and 594 that are associated with respective assets 591, 593, 595. In the illustrated embodiment, each node 590-594 is a medium range node that includes a respective medium power communications interface 596, 602, 608, a respective low power communications interface 598, 604, 610 and one or more respective sensors 600, 606, 612. In the illustrated embodiment, each of the asset nodes 590, 592, 594 and the truck 580 is connected to each of the other ones of the asset nodes through a respective medium power communications path (shown by dashed lines). In some embodiments, the medium power communications paths are LoRa formatted communication paths.

In some embodiments, the communications interfaces 584 and 586 (e.g., a LoRa communications interface and a Bluetooth Low Energy communications interface) on the node on the truck 580 is programmed to broadcast advertisement packets to establish connections with other network nodes within range of the truck node. A warehouse 588 includes medium range nodes 590, 592, 594 that are associated with respective containers 591, 593, 595 (e.g., assets, boxes, pallets, and the like). When the truck node's low power interface 586 is within range of any of the medium range nodes 590, 592, 594 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 590, 592, 594, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 614 or a LoRa formatted communication path 617), the truck node determines the identity information for the medium range node 590 (e.g., a peripheral node), the medium range node's capabilities include retrieving temperature data, and the medium range node's services include transmitting temperature data to other nodes. Depending of the size of the warehouse 588, the truck 580 initially may communicate with the nodes 590, 592, 594 using a low power communications interface (e.g., Bluetooth Low Energy interface). If any of the anticipated nodes fails to respond to repeated broadcasts of advertising packets by the truck 580, the truck 580 will try to communicate with the non-responsive nodes using a medium power communications interface (e.g., LoRa interface). In response to a request from the truck node 584, the medium range node 590 transmits an indication of its measured temperature data to the truck node. The truck node repeats the process for each of the other medium range nodes 592, 594 that generate temperature measurement data in the warehouse 588. The truck node reports the collected (and optionally processed, either by the medium range nodes 590, 592, 594 or the truck node) temperature data to a server over a cellular communication path 616 with a cellular network 618.

Figure 10E:
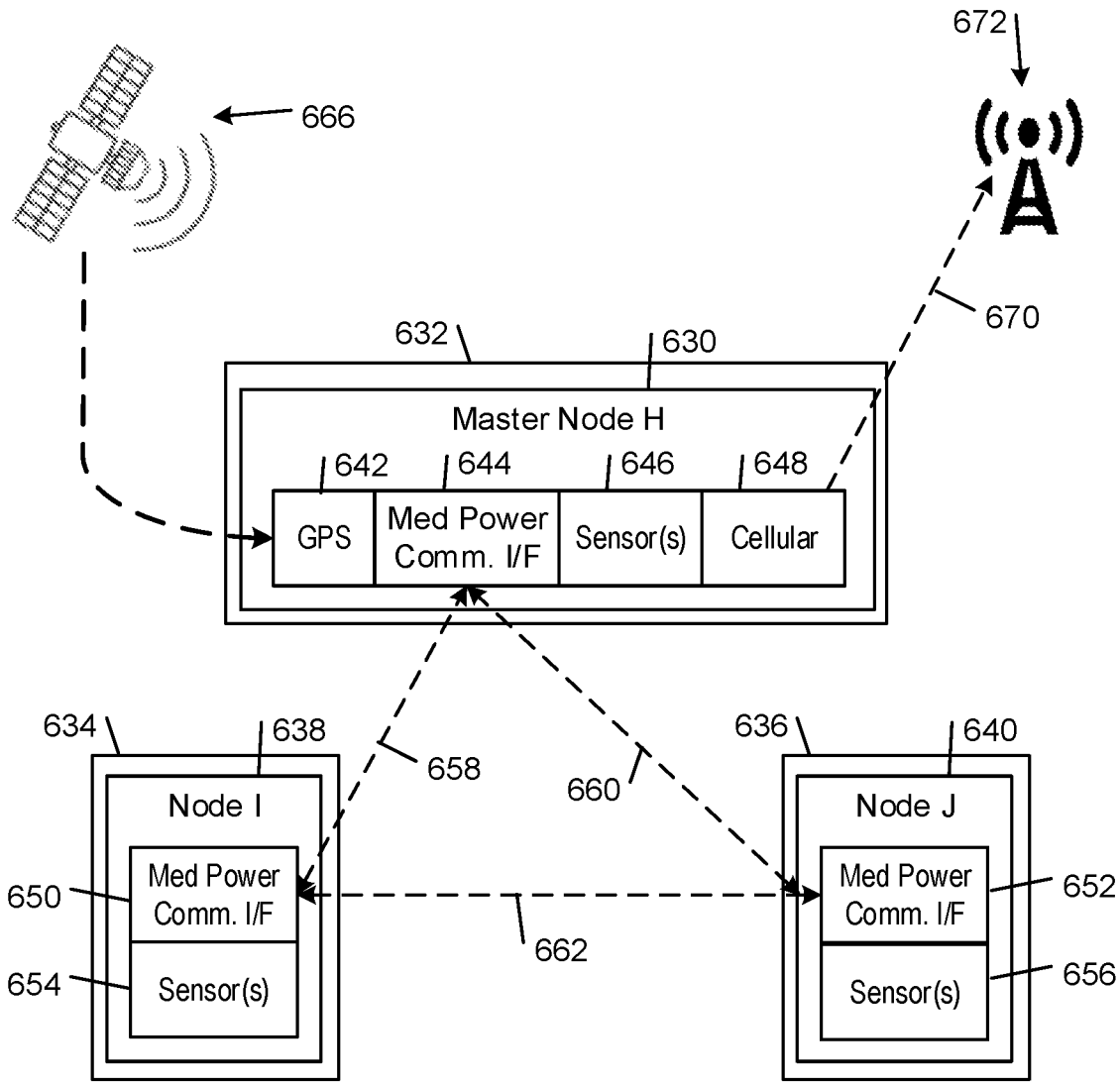

Referring to FIG. 10E, a master node 630 is associated with an item 632 (e.g., an asset) and grouped together with other items 634, 636 (e.g., assets) that are associated with respective peripheral nodes 638, 640. The master node 630 includes a GPS receiver 642, a medium power communications interface 644, one or more sensors 646, and a cellular communications interface 648. Each of the peripheral nodes 638, 640 includes a respective medium power communications interface 650, 652 and one or more respective sensors 654, 656. In the illustrated embodiment, the peripheral and master nodes are connected to one another other over respective pairwise communications paths (shown by dashed lines). In some embodiments, the nodes 630 638, 640 communicate through respective LoRa communications interfaces over LoRa formatted communications paths 658, 660, 662.

In the illustrated embodiment, the master and peripheral nodes 638, 638, 640 include environmental sensors for obtaining information regarding environmental conditions in the vicinity of the associated assets 632, 634, 636. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 630 periodically broadcasts advertising packets in the surrounding area. When the peripheral nodes 638, 640 are within range of master node 630, and are operating in a listening mode, the peripheral nodes 638, 640 will extract the address of master node 630 and potentially other information (e.g., security information) from the advertising packets. If, according to their respective programmatic code, the peripheral nodes 638, 640 determine that hey are authorized to connect to the master node 630, the peripheral nodes 638, 640 will attempt to pair with the master node 630. In this process, the peripheral nodes 638, 640 and the master node and the peripheral nodes determine each other's identities, capabilities, and services. For example, after successfully establishing a respective communication path 658, 660 with each of the peripheral nodes 638, 640 (e.g., a LoRa formatted communication path), the master node 630 determines certain information about the peripheral nodes 638, 640, such as their identity information (e.g., peripheral nodes), their capabilities (e.g., measuring temperature data), and their services include transmitting temperature data to other nodes.

After establishing LoRa formatted communications paths 658, 660 with the peripheral nodes 638, 640, the master node 630 transmits requests for the peripheral nodes 638, 640 to transmit their measured and/or locally processed temperature data to the master node 630.

In the illustrated embodiment, the master node 630 can determine its own location based on geolocation data transmitted by a satellite-based radio navigation system 666 (e.g., GPS, GLONASS, and NAVSTAR) and received by the GPS receiver 642 component of the master node 630. In an alternative embodiment, the location of the master node 630 can be determined using cellular based navigation techniques that use mobile communication technologies (e.g., GSM, GPRS, CDMA, etc.) to implement one or more cell-based localization techniques. After the master node 630 has ascertained its location, the distance of each of the assets 634, 636 from the master node 630 can be estimated based on the average signal strength of the advertising packets that the master node 630 receives from the respective peripheral node. The master node 630 can then transmit its own location and the locations of the asset nodes E, F, and G to a server over a cellular interface connection with a cell tower 672. Other methods of determining the distance of each of the assets 634, 636 from the master node 630, such as Received Signal-Strength Index (RSSI) based indoor localization techniques, also may be used.

In some embodiments, after determining its own location and the locations of the peripheral nodes, the master node 630 reports the location data the collected and optionally processed (e.g., either by the peripheral nodes peripheral nodes 634, 636 or the master node 630) sensor data to a server over a cellular communication path 670 on a cellular network 672.

Cutouts for Re-Use of Tape Node

Figure 11A:
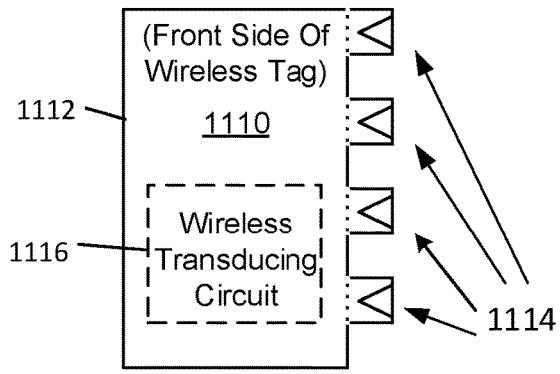
FIG. 11A is a diagrammatic view of a wireless tag containing a wireless transducing circuit adhesively attached to a parcel, according to some embodiments.

FIG. 11A shows an embodiment of a front side 1110 of a wireless tag 1112 that has a plurality of perforated tabs 1114 along one side of the wireless tag 1112. The wireless tag 1112 is an embodiment of a tape node that includes the perforated tabs 1114, such as the tape nodes shown in FIGS. 1-6C. The perforations facilitate the tearing of the tabs 1114 from the main body of the wireless tag 12. Although four tabs are shown in the examples of FIGS. 11A, 11B, 12, 13A, 13B, 14A, 14B, 15, and 16, a wireless tag may include a different number of tabs, according to some embodiments. The wireless tag 1112 includes a wireless transducing circuit 1116 embedded within the wireless tag 1112. The wireless transducing circuit 1116 is an embodiment of the wireless transducing circuit 70. As explained in detail below, each perforated tab 1114 is designed to turn on the wireless transducing circuit 1116 upon tearing a perforated tab 1114 from the main body of the wireless tag 1110.

In some embodiments, the tabs 1114 are not perforated. The tabs 1114 may still be configured to be torn, ripped, or cut apart from the main body of the wireless tag 1110. In some embodiments, the tabs 1114 are configured to be cut with a cutting tool, such as a scissor, from the main body of the wireless tag 1110. Although the tabs 1114 are shown to be on one side of the wireless tag in FIGS. 11A-16, each of the tabs may be located in different areas of the wireless tag.

Figure 11B:
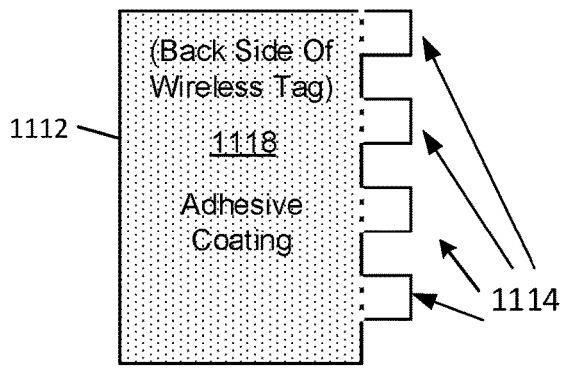
FIG. 11B is a diagrammatic view of the backside of the wireless tag shown in FIG. 1A, according to some embodiments.

FIG. 11B shows an embodiment of a back side 1118 of the wireless tag 1112. The backside of the wireless tag 1112 typically includes an adhesive coating and an overlying release liner. After the release liner is removed from the wireless tag 1112, the wireless tag 1112 may be adhered to a surface of an asset or object using the adhesive coating. The wireless tag 1112 may be used to track an asset or object that the wireless tag 1112 is adhered to.

Figure 11C:
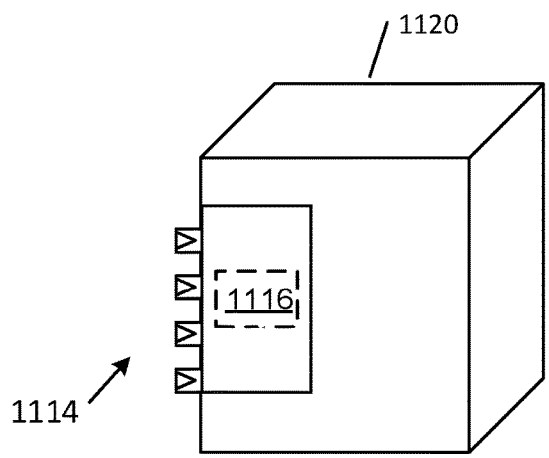
FIG. 11C is a diagrammatic view of a wireless tag attached to the side panel of a parcel, according to some embodiments.

Referring to FIG. 11C, the release liner has been removed to expose the adhesive coating to adhere the wireless tag 1112 to a parcel 1120, as shown in FIG. 1C. In general, the wireless tag 12 may be adhered to any surface of the parcel 1120. The wireless tag 1112 typically is adhered to the top or a side panel of the parcel 1120. In other embodiments, the wireless tag 1112 is attached to other objects or surfaces. For example, the wireless tag 1112 may be attached to wall of a room or building, attached to a portion of a vehicle, attached to a portion of an aircraft, attached to a surface of a vent, or attached to some other object. In the illustrated embodiment, the perforated tabs 114 of the wireless tag 12 are positioned along a side edge of the parcel 1120. In other embodiments, the perforated tabs of the wireless tag 12 are positioned on the top surface of the parcel 1120. When a user wishes to activate the wireless transducing circuit 1116 of the wireless tag 1112, the user may tear off one of the perforated tags 1114. The perforated tabs may be labeled, in some embodiments. In some embodiments, the perforated tabs 1114 may need to be ripped off in a specific order to function properly. For example, the perforated tabs may be labeled with a numerical ordering indicating the order in which a user should tear the perforated tabs 1114. The labeling may also include instructions to guide a user on how to tear or cut the tabs 1114. For example, labeling may include text instructions that read "tear off a tab to activate."

Figure 12:
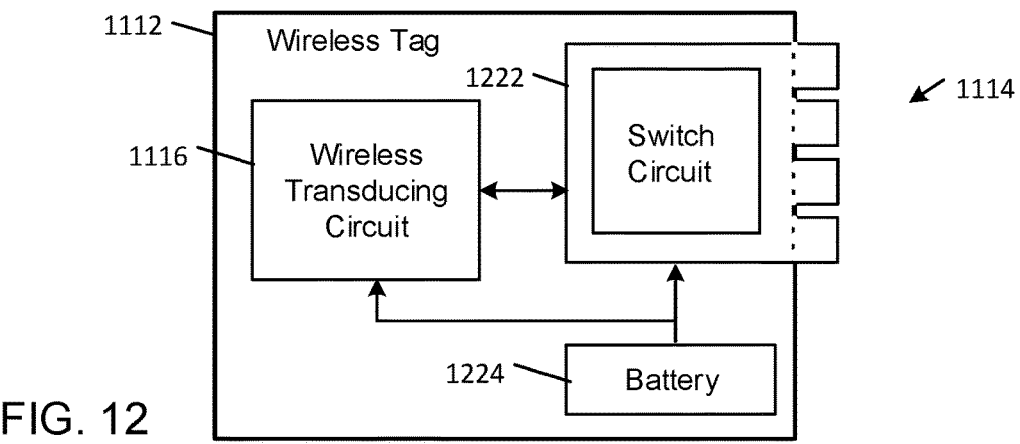
FIG. 12 is a block diagram that shows components of the wireless tag, according to some embodiments.

FIG. 12 shows an embodiment of the wireless tag 1112 that includes a wireless transducing circuit 1116, a switching circuit 1222, and an electrical energy storage device 1224 (e.g., a battery). The wireless transducing circuit 1116 includes one or more wireless communication systems, a processor, and an energy storage device, as discussed above with respect to FIG. 3. The switching circuit 1122 directs the flow of electrical current from the battery 24 through each of the perforated tabs until a selected tab is torn off from the wireless tag to create an open circuit in a portion of a wake circuit in the selected tab location. When an open circuit in the portion of the wake circuit positioned in the selected tab location is detected, the wireless transducing circuit 1116 is activated, as is discussed in further detail below with respect to FIGS. 14A and 14B. After the wireless transducing circuit 1116 is activated, the wireless tag 1112 performs functions according to a role assigned to the wireless tag 1112 by the IOT system 400. At some point, the wireless transducing circuit 1116 may deactivate or enter a hibernation mode where its functionality is limited or reduced. This may be done to conserve batteries of the wireless tag 1112. Afterwards, a user may tear or cut a remaining perforated tab 1114 that is still attached to the main body of the wireless tag 1110 in order to reactivate the wireless transducing circuit 1116. Subsequently, the wireless tag 1112 may perform functions according to a new role assigned to the wireless tag 1112 by the IOT system 400. This process of reactivating the wireless tag 1112 after its wireless transducing circuit 1116 has been deactivated or entered a hibernation mode may be repeated for as many tabs 1114 remain and as long as the energy storage of the wireless tag 1112 (including the energy storage of the wireless transducing circuit 1116 and the battery 1224) has not run out.

In some embodiments, upon tearing or cutting a tab 1114 from the main body of the wireless tag 1110, the wireless tag 1112 initializes or re-initializes if it is not the first tab to be removed. The initialization or reinitialization step (also referred to herein as provisioning) may include searching for a wireless node (e.g., a client device, another tape node, a gateway device, or a server) of the IOT system 400 to communicate with. In some embodiments, the wireless tag 1112 establishes a communication connection with a wireless node of the IOT system and requests configuration files. In response, the IOT system 400 supplies the wireless tag 1112 the requested configuration files via the wireless node, and the wireless tag 1112 configures its software, firmware, and hardware based on the received configuration files. The configuration files may include data which instructs the wireless tag 1112 to carry out a function or role in the IOT system 400. For example, the configuration file may include instructions to track the location or condition of an asset (such as the parcel 1120) that the wireless tag 1112 is adhered to.

Figure 13A:
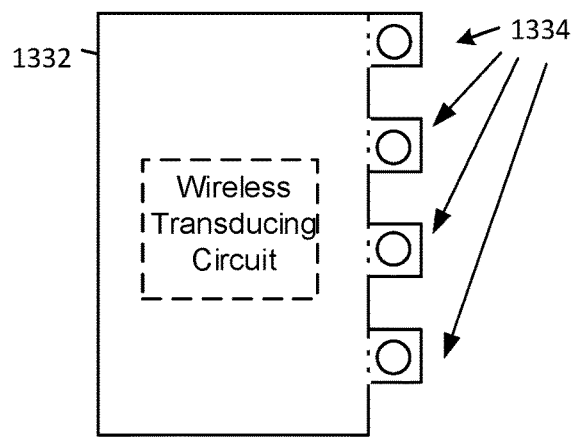
FIGS. 13A, 13B, and 13C show different variations of the perforated detachable tabs of the wireless tags, according to some embodiments.
Figure 13B:
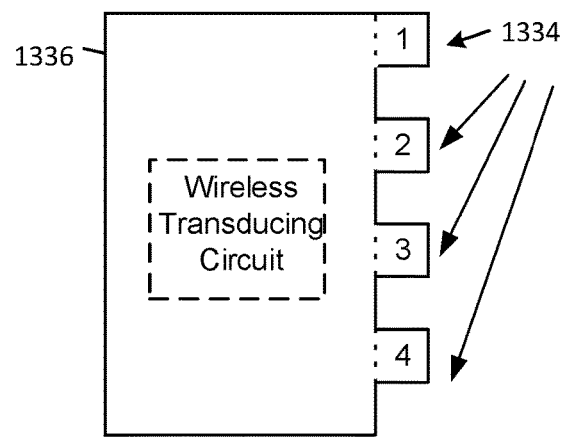
Figure 13C:
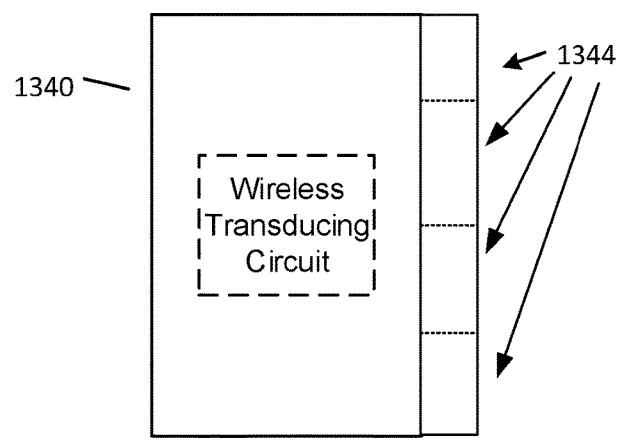

FIGS. 13A, 13B, and 13C show different versions of the wireless tag 1112. FIG. 3A shows an embodiment of the wireless tag 1332 that includes a series of hole punch indicia 1334 directing the user to punch a hole through a circle indicia marked on a tab to create an open circuit in a portion of a wake circuit positioned in the selected tab location. FIG. 13B shows an embodiment of the wireless tag 1336 that includes a series of numerical indicia directing the user to tear off a tab to create an open circuit in a portion of the wake circuit positioned in the selected tab location. FIG. 13C shows an embodiment of the wireless tag 1340 that includes multiple cut portions 1344 instead of separated tabs. In this case, a user makes an incision or punches a hole through a cut portion 1344 to create an open circuit in a portion of the wake circuit positioned in the selected tab location. In other embodiments, each of the cut portions 1344 may be separated from each other (like the tabs 1114) or may be positioned in different areas of the wireless tag 1340. Each of the exemplary wireless tags 1112, 1132, 1136, and 1140 shown in FIGS. 11A, 13A, 113B and 13C may optionally include perforations that facilitate tearing of the tabs, punching a hole in a tab, or making an incision in a cut portion to create an open circuit in the portion of the wake circuit in the selected tab location.

In some embodiments, tearing off a tab from the wireless tag 1112 turns on the wireless transducing circuit 1116. In one embodiment, tearing a tab off from the wireless tag 1112 causes a circuit component to turn on the wireless transducing circuit 1116 and thereby enable the wireless tag 1112 to communicate with other wireless nodes in the vicinity of the wireless tag 1112 and perform other functions, such as computation. In some embodiments, the wireless tag 1112 is configured to turn off (also referred to herein as "powering off", "powering down", and "deactivating") or enter a hibernation mode in response to satisfying certain criteria. The wireless tag 1112 turns off or enters a hibernation mode by reducing or disabling functions of the wireless transducing circuit 1116. The wireless transducing circuit 1116 may limit its power consumption or completely stop drawing electrical power from its energy storage in the turned off state or the hibernation state.

For example, in some embodiments, the wireless transducing circuit 1116 is configured to turn off in response to detecting that the wireless tag 1112 is in a target physical location (e.g., a warehouse, an office building, or a particular container). If the wireless tag circuit 1116 has turned off, but the current location of the wireless tag 1112 is not the final destination, a user can tear off another tab from the wireless tag 1112 to turn on the wireless transducing circuit 1116 and thereby enable the wireless tag 1112 to communicate with other wireless nodes in the vicinity of the wireless tag 1112. In this way, the wireless tag can be used over multiple journeys using the same battery. By being able to selectively activate and deactivate the wireless transducing circuit 1116, the wireless tag is able to conserve its stored energy (e.g., its batteries) when the functions of the wireless transducing circuit 1116 is not needed. For example, location tracking functions of the wireless tag may only be required when the wireless tag is in transit, since the location of the wireless tag will stay relatively the same when it is not in transit. Thus, the wireless tag may conserve its batteries by deactivating when it's in between two legs of a journey. The wireless tag may then be easily reactivated and reinitialized for its next leg of the journey by a user who tears a tab, punctures a tab, or makes an incision in a cut area, of the wireless tag.

In other embodiments, the criteria for the wireless tag 1112 turning off or entering a hibernation mode includes receiving an instruction from a wireless node of the IOT system 400 via wireless communication between the wireless node and the wireless tag 1112. The received instruction may include data that indicates the wireless tag 1112 has completed a function or role and should now deactivate or enter a hibernation mode. In further embodiments, the criteria for the wireless tag 1112 includes detecting the presence of a specific wireless node in the IOT system 400. For example, the wireless tag may be configured to deactivate when it detects that it is in the wireless communication range of a specific gateway device. When the wireless tag detects a wireless communication advertisement from the specified gateway device, the wireless tag deactivates. The wireless tag 1112 may be configured this way because being within a communication range of the specified gateway device indicates the wireless tag 1112 is within a threshold distance of a target location associated with the gateway device, according to some embodiments.

In other embodiments, the wireless tag 1112 includes one or mores sensors connected to the wireless transducing circuit that measure environmental conditions of the wireless tag 1112. For example, the wireless tag 1112 may include a temperature sensor, a vibration sensor, a light sensor, a accelerometer, an altitude sensor, a GPS sensor, some other sensor, or some combination thereof. The criteria for the wireless tag 1112 turning off or entering a hibernation mode includes detecting a sensor value from the one or more sensors, such as a temperature value measured by a temperature sensor. In further embodiments, the criteria for the wireless tag 1112 includes detecting a sensor value from one of the one or more sensors that is within a threshold range of sensor values. For example, the wireless tag 1112 may deactivate in response to a temperature sensor of the wireless tag 1112 detecting a temperature that is above a threshold temperature of 70 degrees Celsius.

Figure 14A:
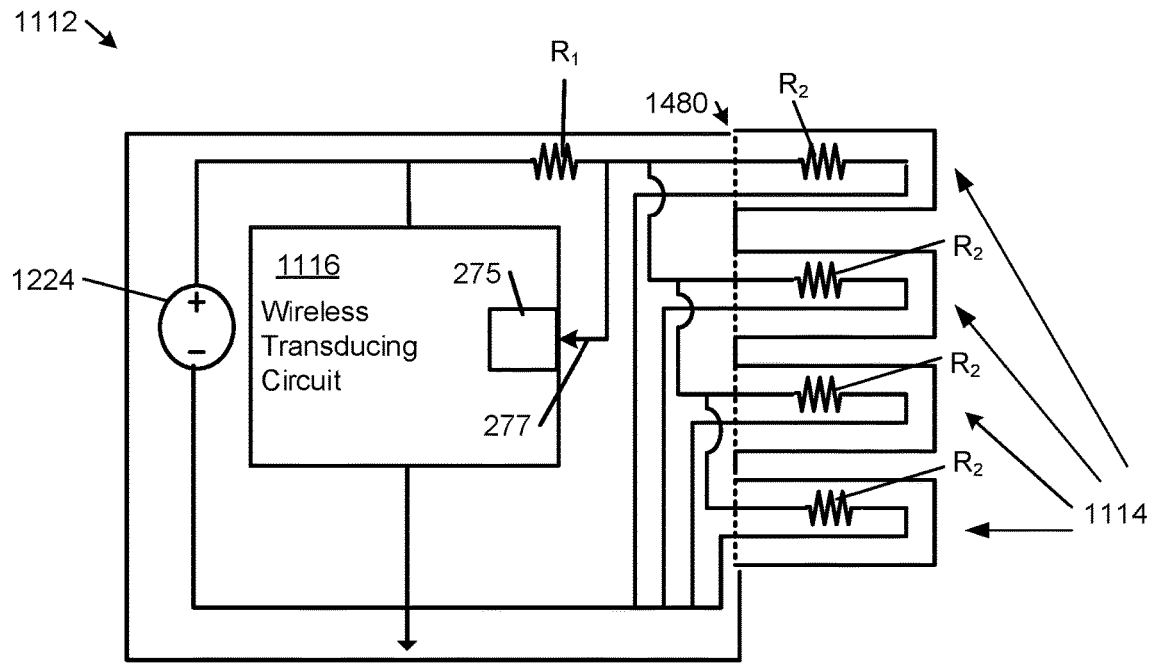
FIG. 14A is a wireless tag circuit that has a set of perforated detachable tabs, according to some embodiments.

FIG. 14A shows an example diagram of a circuit of the wireless tag 1112 that includes a wireless transducing circuit 1478, a wake circuit 275, a resistor R1, and a parallel arrangement of resistors R2 that have a lower resistance value than the resistance value of R1. In operation, the wake circuit 275 is configured to transition from an off state to an on state when the voltage on the wake node 277 exceeds a threshold level, at which point the wake circuit transitions to an on state to power-on the wireless tag 1112. In the illustrated example, this occurs when the user separates a tab from the wireless tag 1112, for example, by cutting across the wireless tag 12 at a designated perforated tear line 280. In particular, in its initial, un-cut state, a minimal amount of current flows through the resistors R1 and R2 from the battery 1224. As a result, the voltage on the wake node 277 remains below the threshold turn-on level. After the user cuts or tears one of the tabs 1114 from the wireless tag 1112 along the designated cut-line 1480, an open circuit in the loop 1482 is created, which pulls the voltage of the wake node 277 above the threshold level and turns on the wake circuit 275. As a result, the voltage across the energy source 1224 will appear across the wireless transducing circuit 1116 and, thereby, turn on the wireless tag 1112.

In some cases, the wireless tag 1112 is configured to turn off the wake circuit 275 in response to a determination that the wireless tag 1112 has satisfied the criteria for turning off. For example, the criteria may include the wireless tag reaching a target destination. The location of the wireless tag 1112 may be determined based on wireless communication or based on sensor data from a sensor of the wireless tag 1112 connected to the wireless transducing circuit 1116 (e.g., based on receiving GPS coordinates corresponding to the location of the wireless tag 1112). The wireless tag may deactivate or enter a hibernation mode, in response to reaching the target destination.

Figure 14B:
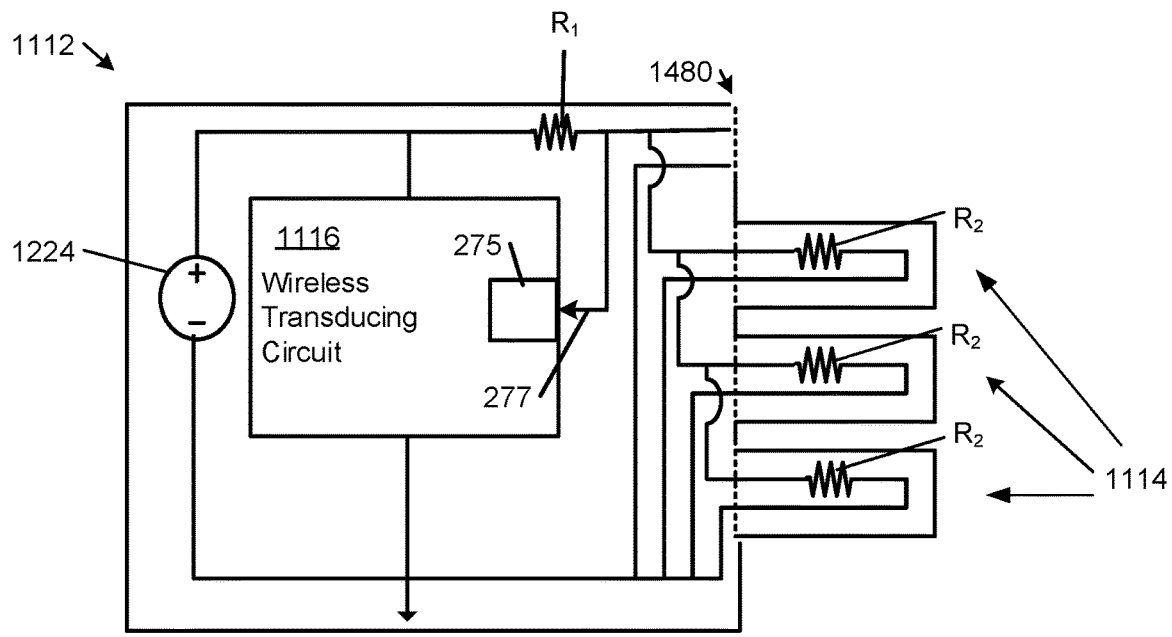
FIG. 14B shows the wireless tag circuit of FIG. 14A after a top perforated detachable tab has been torn off from the main body of the wireless tag, according to some embodiments.

FIG. 14B shows the wireless tag 1112 after a first tab of the tabs 1114 has been removed. After the wireless tag 1112 has deactivated, the wireless tag 1112 can be reused by reactivating the wireless tag 1112. The wireless tag can be reactivated by tearing another tab of the tabs 1114 off from the wireless tag 1112, which will turn on the wake circuit 275 and power up the wireless transducing circuit 1116.

Figure 15:
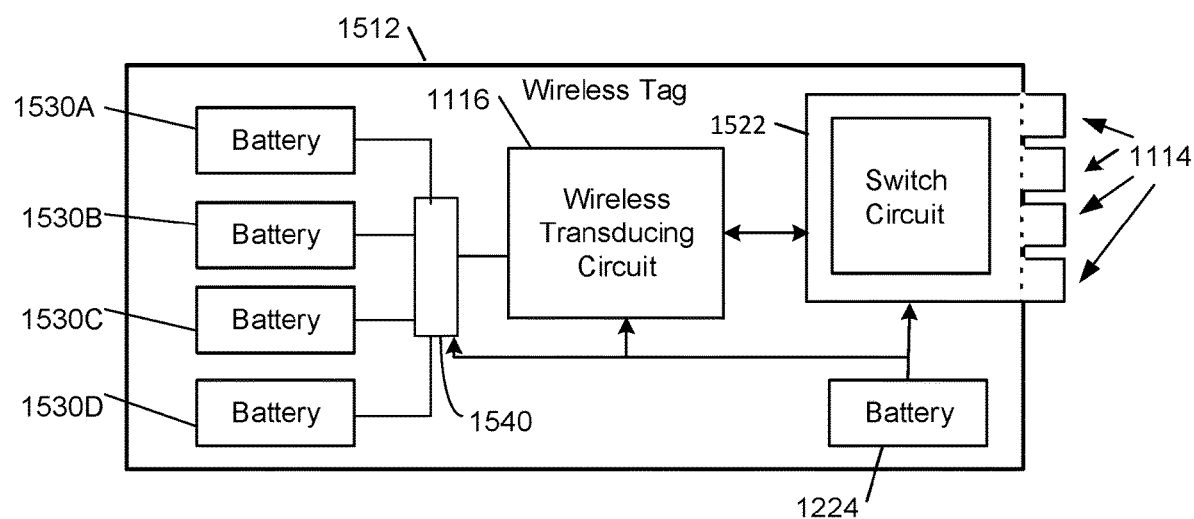
FIG. 15 shows an alternate embodiment of the wireless tag shown in FIG. 12, according to some embodiments.

FIG. 15 shows an alternate embodiment of the wireless tag 1512 shown in FIG. 12. The wireless tag 1412 includes the wireless transducing circuit 1116, the switch circuit 1222, and the battery 1224. The wireless transducing circuit 1116 includes multiple energy storage devices 1530A-1530D, collectively referred to herein as energy storage devices 1530. The energy storage devices are shown in the example of FIG. 15 to be batteries 1530, but in other embodiments, other energy storage devices may be used. The wireless tag 1512 is configured to switch between a different one of the energy storage devices 1530 for powering the wireless transducing circuit 1116 when one of the tabs 1114 is torn, cut, or punctured to activate or reactivate the wireless tag 1512. When one of the tabs 1114 is torn cut or punctured, the switch circuit 1522 sends a signal to a energy storage switch 1540 which selects a new a energy storage device 1530A-1530D. Although four batteries 1530 are shown in FIG. 15, the wireless tag 1512 may include a different number of batteries configured to power the wireless transducing circuit. Also, the number of batteries 1530 does not necessarily match the number of tabs 1114, in some embodiments.

Figure 16A:
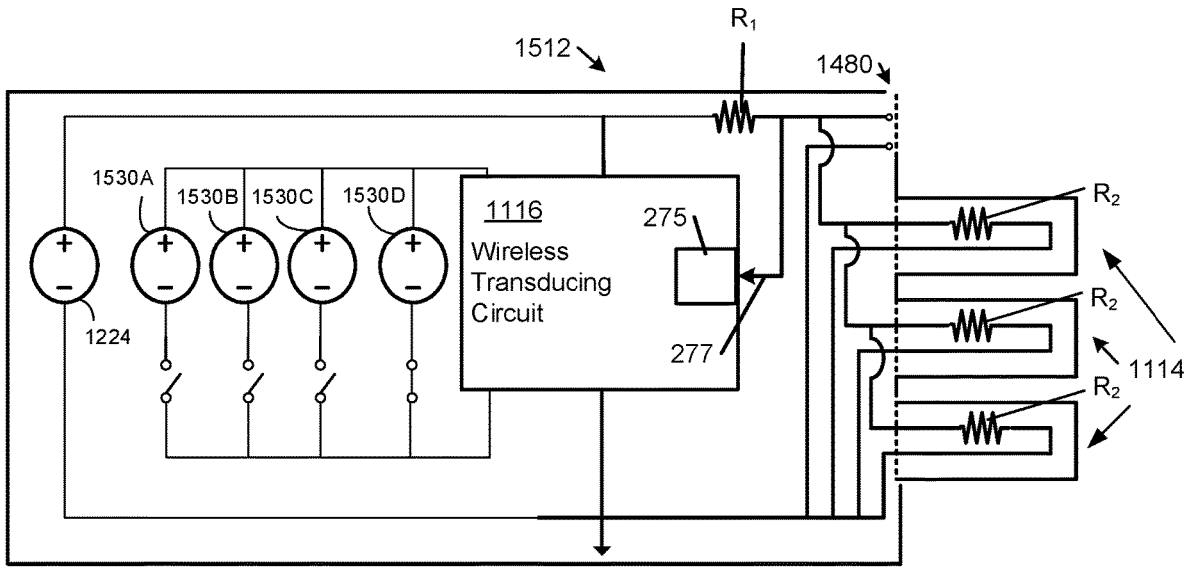
FIG. 16A-16B are diagrams that show an example of a circuit of the wireless tag shown in FIG. 15, according to some embodiments.

FIG. 16A is a diagram that shows an example of a circuit of the wireless tag 1512 shown in FIG. 15, according to some embodiments. The example circuit operates similar to the example circuit shown in FIGS. 14A and 14B, except that the wireless transducing circuit 1116 includes multiple batteries 1530 that may each power the wireless transducing circuit 1116 when it is activated. FIG. 16A shows the wireless tag 1512 after a first tab 1114 has already been torn or cut from the wireless tag 1512. In response to the first tab 1114 being torn or cut, a first battery 1530D is selected, and the first battery 1530D supplies electrical power to the wireless transducing circuit 1116 while the wireless tag 1512 is activated. In response to a criteria being satisfied, the wireless tag 1512 deactivates the wireless transducing circuit 1116.

Figure 16B:
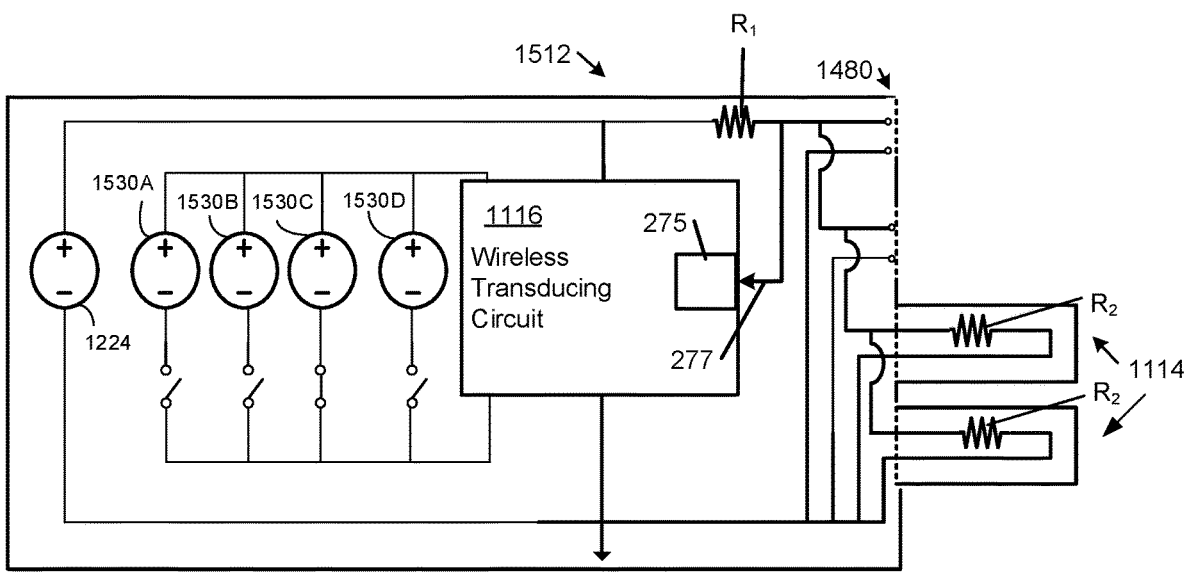

To reactivate the wireless tag 1512, a second tab of the tabs 1114 is torn or cut from the wireless tag 1512. FIG. 16B shows the example of the circuit of the wireless tag 1512 after the second tag has been torn or cut from the wireless tag 1512. In response, the wireless transducing circuit 1116 switches from using the first battery 1530D to using the second battery 1530C to supply power to the wireless transducing circuit 1116. Similarly, the battery used to power the wireless tag 1512 may switch to a different battery upon successively tearing or cutting a new tab of the tabs 1114 from the wireless tag 1512.

By switching between different the different batteries 1530, the wireless tag 1512 may be able to complete different functions and roles even if one of the batteries 1530 is out of power. By using multiple batteries 1530, the wireless tag 1512 may avoid an instance where a user fails to reactivate the wireless tag 1512 after tearing or cutting an available tab 1114 from the wireless tag 1512. For example, in the case where one battery is used to power a wireless transducing circuit of a wireless tag, if the battery is depleted or below a threshold level, the wireless tag may not reactivate even when the user tears or cuts an available tab from the wireless tag since the battery is unable to power the wireless transducing circuit. Using the wireless tag 1512, a user may be ensured a specific number of reactivations for the wireless tag 1512, according to some embodiments.

In some embodiments, one or more of the batteries 1530 may have a different battery capacity, voltage, current rating, or some combination thereof than the other batteries. This may be the case, when the wireless tag 1512 is expected to perform different functions after each activation that requires a different amount of stored energy, for example.

In other embodiments, the wireless tag 1512 only switches between the use of the different batteries 1530 a battery of the batteries 1530 that is currently being used is depleted or below a threshold charge level.

In some embodiments a wireless tag that includes the tabs 1114 for reactivating the wireless tag may initially be a part of a strip or roll of wireless tags, such as with the tape nodes shown in FIGS. 1A and 4. The wireless tag may be activated a first time when the wireless tag is separated from the roll or strip, as is discussed with respect to FIGS. 6A-6C. The wireless tag may deactivate in response to satisfying a criteria. In order to reactivate the wireless tag, a user may tear or cut one of the tabs 1114 to reactivate it. This reactivation process may be repeated whenever the wireless tag is deactivated by tearing or cutting another available tab 1114 that has not yet been cut or torn from the wireless tag. Thus, the wireless tag can be reactivated using the tabs 1114.

The above discussion regarding the wireless tag 1112 and the wireless tag 1512 also applies to wireless tags that have different form factors or reactivation mechanisms, such as the wireless tags 1332, 1336, and 1340, according to some embodiments.

Figure 17:
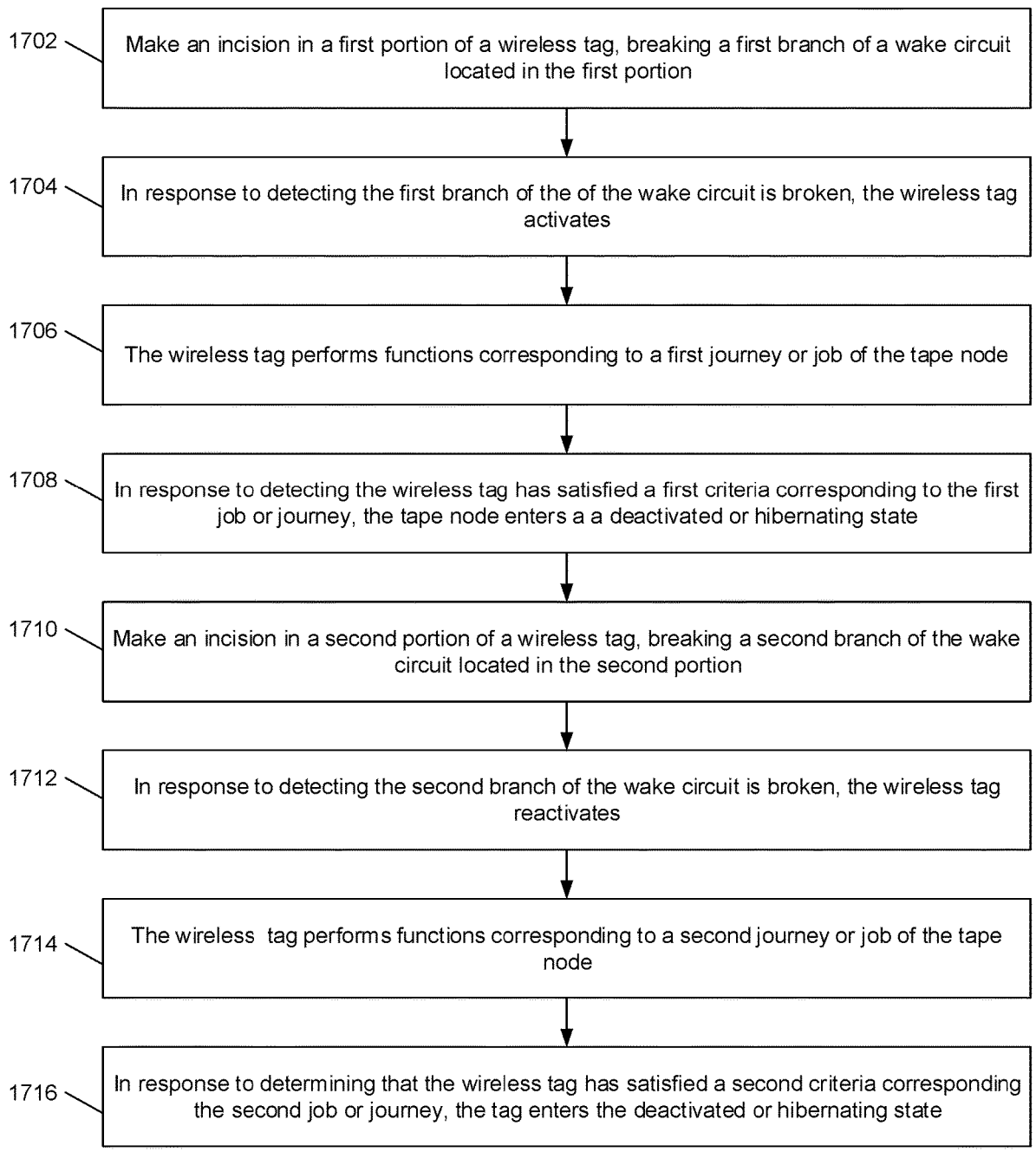
FIG. 17 is a flowchart showing an example method for reusing a wireless tag, according to some embodiments.

FIG. 17 is a flowchart showing an example method 1701 for reusing a wireless tag, according to some embodiments. The example method 1701 includes a user making an incision 1702 in a first portion of a wireless tag, breaking a first branch of a wake circuit located in the first portion. In response to detecting the first branch of the of the wake circuit is broken, the wireless tag activates 1704, powering on a wireless transducing circuit of the wireless tag. Upon activating, the wireless tag may wirelessly communicate with other wireless nodes of the IOT system 400. The wireless tag may receive configuration files from a server of the IOT system 400 via the other wireless nodes. In some embodiments, the wireless tag may receive the configuration files from a client device, e.g. a smartphone, of a user that is wirelessly communicating with the wireless tag. The wireless tag performs functions 1706 corresponding to a first journey or job of the wireless tag. For example, the wireless tag may track an asset that the wireless tag is attached to. In response to detecting the wireless tag has satisfied a first criteria corresponding to the first job or journey, the tape node enters a deactivated or hibernating state 1708. At a later time, a user may wish to reactivate the tape. The user makes an incision 17010 in a second portion of a wireless tag, breaking a second branch of the wake circuit located in the second portion. In response to detecting the second branch of the wake circuit is broken, the wireless tag reactivates 1712. In some embodiments, the wireless tag may reinitialize and request new configuration files from the server of the IOT system 400 or other wireless nodes of the IOT system 400. The wireless tag performs functions corresponding to a second journey or job of the tape node 1714. In response to determining that the wireless tag has satisfied a second criteria corresponding the second job or journey, the tag enters the deactivated or hibernating state 1716. In further embodiments, the wireless tag may be reactivated again by a user making an incision in a third portion of the wireless tag where a third portion of a wake circuit is located. Subsequent reactivations may similarly be performed by making an incision in respective subsequent portions of the wireless tag.

Figure 18:
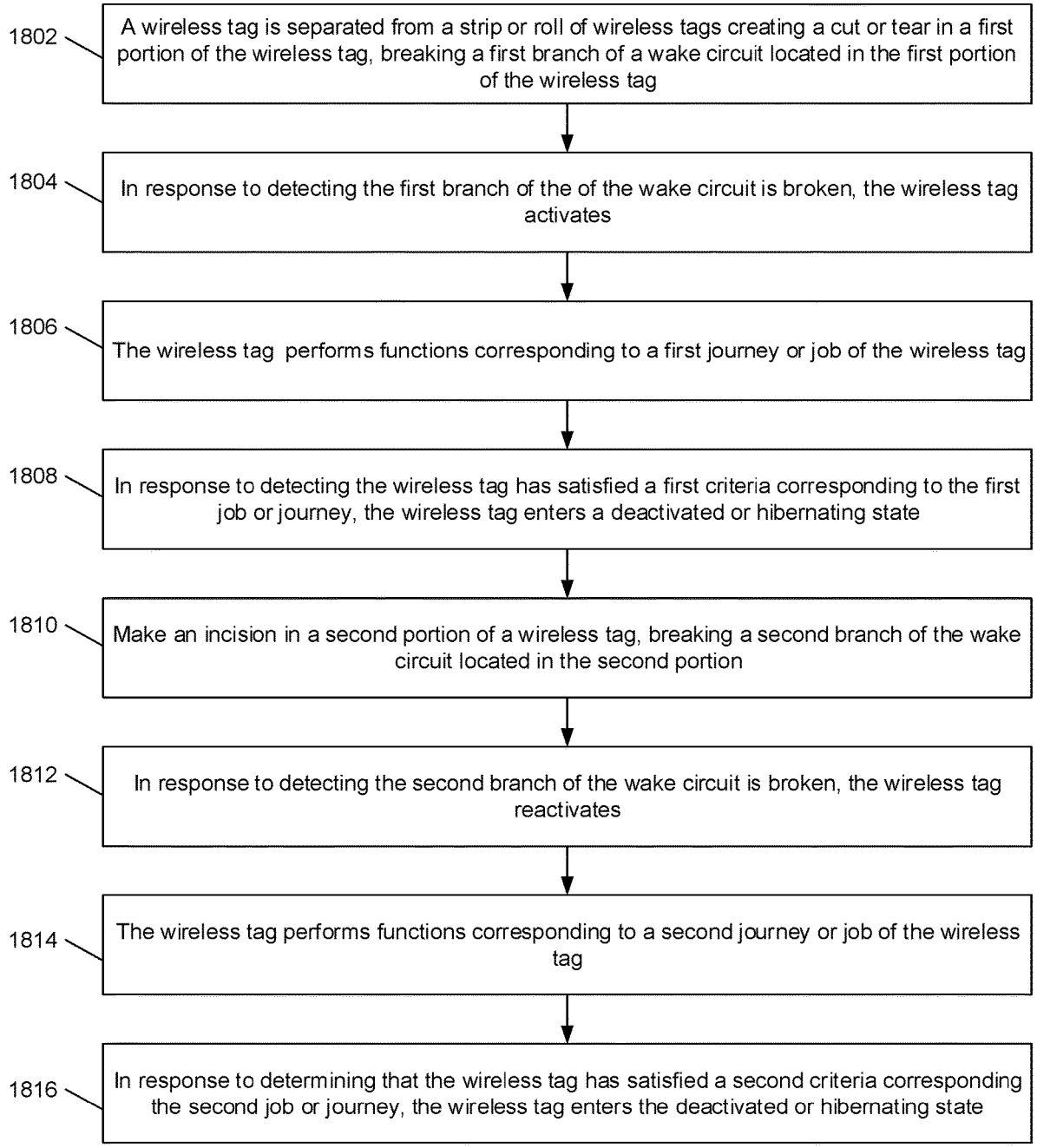
FIG. 18 is a flowchart showing an example method for reusing a wireless tag that has been separated from a roll or strip of wireless tags, according to some embodiments.

FIG. 18 is a flowchart showing an example method 1801 for reusing a wireless tag that has been separated from a roll or strip of wireless tags, according to some embodiments. In the example method 1801, a wireless tag is initially connected to other wireless tags in a roll or strip of wireless tags. The wireless tag is separated 1802 from a strip or roll of tape nodes which creates a cut or tear in a first portion of the wireless tag, breaking a first branch of a wake circuit located in the first portion of the wireless tag. In response to detecting the first branch of the of the wake circuit is broken, the wireless tag activates 1804. The wireless tag performs functions 1806 corresponding to a first journey or job of the wireless tag. In response to detecting the tape node has satisfied a first criteria corresponding to the first job or journey, the wireless tag enters a deactivated or hibernating state 1808. At a later time, user wishes to reactivate the wireless tag. The user makes an incision 1810 in a second portion of a tape node, breaking a second branch of the wake circuit located in the second portion. In response to detecting the second branch of the wake circuit is broken, the wireless tag reactivates 1812. The wireless tag performs functions corresponding to a second journey or job of the wireless tag 1814. In response to determining that the tape node has satisfied a second criteria corresponding the second job or journey, the tape node enters the deactivated or hibernating state 1816. In further embodiments, the wireless tag may be reactivated again by a user making an incision in a third portion of the wireless tag where a third portion of a wake circuit is located. Subsequent reactivations may similarly be performed by making an incision in respective subsequent portions of the wireless tag.

The methods 1701 and 1801 may include additional or different steps than those shown in FIGS. 17 and 18, according to some embodiments.

In some embodiments, a wireless tag may keep track of how many tabs have been torn or cut. For example, the wireless tag may detect the number of tabs torn or cut, based on the voltage received at the wake node 277. The wireless tag may store the number or the received voltage on a memory of the wireless transducing circuit 1116, according to some embodiments. The wireless tag may report the number or received voltage to other wireless nodes of the IOT system when the wireless tag is activated. For example, the wireless tag may wirelessly communicate with a user's client device when the wireless tag is activated. The wireless tag may transmit data corresponding to the number of tabs that have been torn or cut to the client device. The client device may then display the number to the user on an app or may relay the number to a server of the IOT system 400 via the internet using cellular communications, according to some embodiments. Tracking the number of times the wireless tag was reactivated may be useful for determining what roles, jobs, journeys, or functions the wireless tag is still capable of performing.

Each time a wireless tag is activated or reactivated, the wireless tag may report its condition to the IOT system 400 via another wireless node of the IOT system. In some embodiments, the wireless tag includes a cellular communication interface and directly transmits its condition to a server of the wireless IOT system 400. In some embodiments, the wireless tag reports its battery life to the wireless IOT system 400, so that the wireless IOT system 400 may determine if the wireless tag is suitable for a job or role. In cases where the battery life is below a threshold level, the IOT system 400 may notify a user by transmitting an alert, notification, message, SMS, email, or other transmission to the user's client device. The user's client device may then display the alert on an app or website. The alert may notify the user not to use the respective wireless tag for respective job or role. In some embodiments, the user may be notified to replace the wireless tag with a different wireless tag, for example one with a larger remaining battery charge level.

In some embodiments, in response to determining that the wireless tag has no remaining tabs 1114 or cut portions 1344 intact, the IOT system 400 issues a reclamation of the wireless tag. The IOT system 400 may do so by notifying a human operator of the IOT system 400 to find and retrieve the wireless tag at its last known location, according to a database of the IOT system 400 tracking the location of the wireless tag while it is activated. After the wireless tag has been retrieved, the wireless tag may be refurbished, serviced, recycled, or disposed of.

Computer Apparatus

Figure 19:
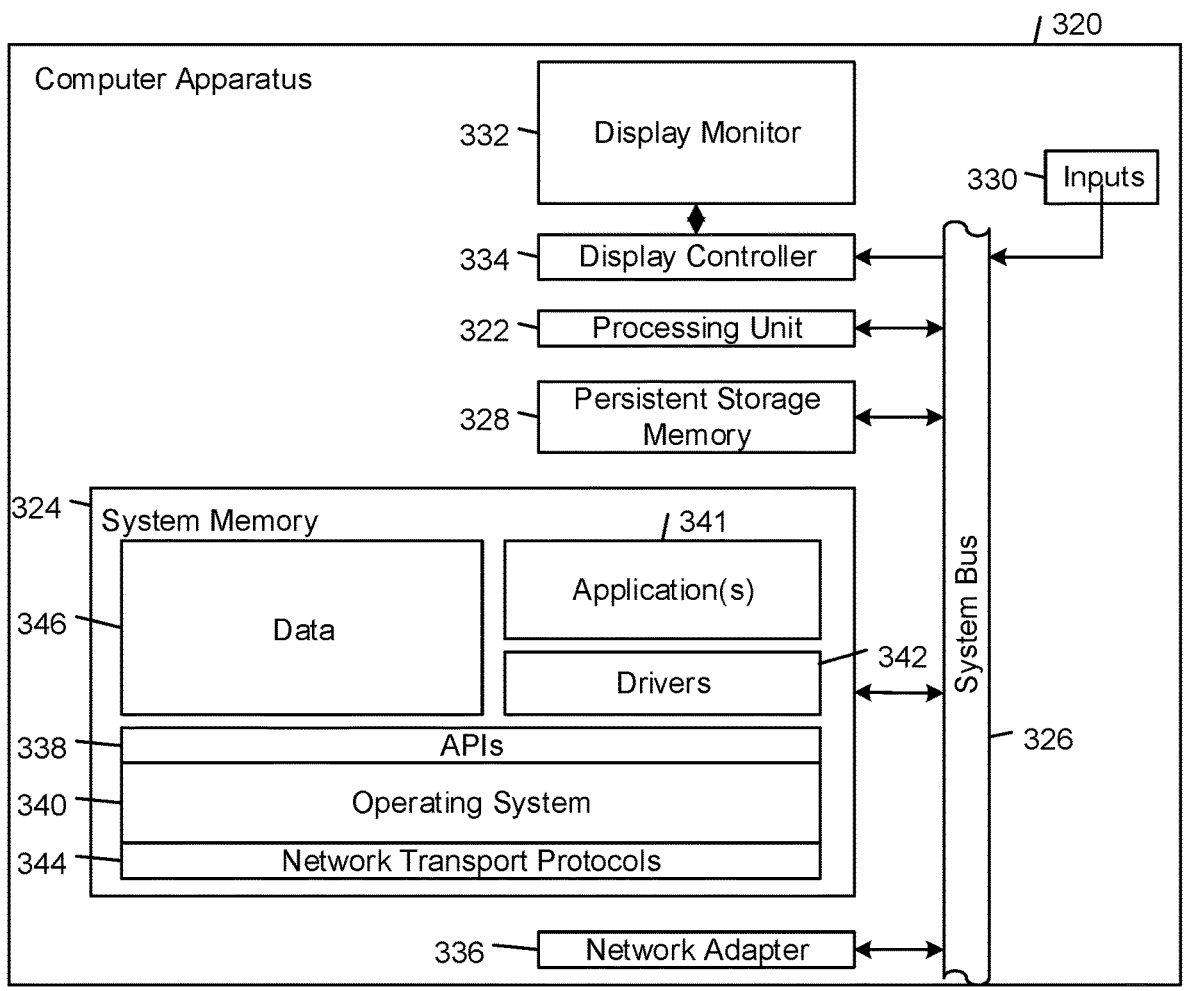
FIG. 19 shows an example embodiment of computer apparatus, according to some embodiments.

FIG. 19 shows an example embodiment of computer apparatus 320 that, either alone or in combination with one or more other computing apparatus, is operable to implement one or more of the computer systems described in this specification.

The computer apparatus 320 includes a processing unit 322, a system memory 324, and a system bus 326 that couples the processing unit 322 to the various components of the computer apparatus 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains start-up routines for the computer apparatus 320, and a random access memory (RAM). The system bus 326 may be a memory bus, a peripheral bus or a local bus, and may be compatible with any of a variety of bus protocols, including PCI, VESA, Microchannel, ISA, and EISA. The computer apparatus 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

A user may interact (e.g., input commands or data) with the computer apparatus 320 using one or more input devices 330 (e.g. one or more keyboards, computer mice, microphones, cameras, joysticks, physical motion sensors, and touch pads). Information may be presented through a graphical user interface (GUI) that is presented to the user on a display monitor 332, which is controlled by a display controller 334. The computer apparatus 320 also may include other input/output hardware (e.g., peripheral output devices, such as speakers and a printer). The computer apparatus 320 connects to other network nodes through a network adapter 336 (also referred to as a "network interface card" or NIC).

A number of program modules may be stored in the system memory 324, including application programming interfaces 338 (APIs), an operating system (OS) 340 (e.g., the Windows® operating system available from Microsoft Corporation of Redmond, Washington U.S.A.), software applications 341 including one or more software applications programming the computer apparatus 320 to perform one or more of the steps, tasks, operations, or processes of the locationing and/or tracking systems described herein, drivers 342 (e.g., a GUI driver), network transport protocols 344, and data 346 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A wireless tag, comprising:
   a main body comprising an embedded wireless transducing circuit coupled to a plurality of resistive loops, each resistive loop coupled at one end to a single node, wherein the single node is coupled to the embedded wireless transducing circuit such that each resistive loop is coupled in parallel to other of the resistive loops, and each resistive loop being embedded in respective tabs extending from the main body of the wireless tag, wherein the wireless transducing circuit comprises a globally unique identifier, a battery, a processor, a memory comprising processor-readable instructions, and a wireless communication interface;
   a first tab of the respective tabs connected to the main body, the first tab comprising a first portion of the plurality of resistive loops, wherein an incision in the first tab causes an open circuit in the first portion of the plurality of resistive loops;
   a wake circuit configured to turn-on in response to an open circuit occurring in the first portion of the plurality of resistive loops, wherein the wireless transducing circuit is configured to turn on responsive to the wake circuit receiving a voltage level above a first threshold voltage.

2. The wireless tag of claim 1, comprising an adhesive layer and an overlying release liner on a backside of the main body of the wireless tag.

3. The wireless tag of claim 1, wherein the embedded wireless transducing circuit is configured to turn off in response to determining that the wireless tag has satisfied a first criteria.

4. The wireless tag of claim 3, wherein the embedded wireless transducing circuit is configured to turn-off responsive to determining that location of the wireless tag corresponds to a predetermined location.

5. The wireless tag of claim 3, further comprising:
   a second tab of the respective tabs connected to the main body, the second tab comprising a second portion of the plurality of resistive loops, wherein an incision in the second tab causes an open circuit in the second portion of the resistive loops,
   wherein the wake circuit is configured to reactivate and turn on in response to an open circuit occurring in the second portion of the plurality of resistive loops, the wireless transducing circuit configured to reactivate and turn on responsive to the wake circuit receiving a voltage level above a second threshold voltage.

6. The wireless tag of claim 1, wherein the main body is configured to attach to an asset for tracking the asset.

7. The wireless tag of claim 1, wherein the wireless tag is associated with an asset and is configured to track location of the asset by performing wireless communications with wireless nodes of a tracking system associated with the wireless tag.

8. The wireless tag of claim 1, wherein the wireless tag comprises a plurality of batteries.

9. The wireless tag of claim 8, wherein the wake circuit turning on in response to the open circuit occurring in the first portion of the plurality of resistive loops comprises connecting a first battery of the plurality of batteries to the embedded wireless transducing circuit.

10. The wireless tag of claim 9, further comprising a second tab of the respective tabs connected to the main body, the second tab comprising a second portion of the plurality of resistive loops, wherein
    the embedded wireless transducing circuit is configured to turn off in response to determining that the wireless tag has satisfied a first criteria,
    the second tab is configured, such that an incision in the second tab causes an open circuit in the second portion of the plurality of resistive loops,
    the wake circuit is configured to reactivate and turn on in response to an open circuit occurring in the second portion of the plurality of resistive loops, the reactivating comprising disconnecting the first battery and connecting a second battery of the plurality of batteries to the embedded wireless transducing circuit, the wireless transducing circuit configured to reactivate and turn on responsive to being connected to the second battery.

11. The wireless tag of claim 1, wherein the incision in the first tab is configured to be cut using a cutting tool or hole punch.

12. The wireless tag of claim 1, wherein the incision in the first tab is configured to be cut by a user tearing the first tab away from the main body.

13. The wireless tag of claim 12, the wireless tag comprising a perforation in at least one of a flexible substrate and a cover layer of the wireless tag, the perforation configured to guide the user in tearing the first tab away from the main body.

14. The wireless tag of claim 1, wherein the incision in the first tab is configured to be located in a first region, the first region indicated on the by a cut line displayed on the wireless tag.

15. A method comprising:
    activating a wireless transducing circuit of a wireless tag, by making a first incision in a first portion of the wireless tag, the first incision creating an open circuit in a first branch of a wake circuit located in the first portion of the wireless tag,
    after the wireless transducing circuit has deactivated in response to satisfying a first criteria corresponding to a first job or journey of the wireless tag, reactivating the wireless transducing circuit of the wireless tag, by making a second incision in a second portion of the wireless tag, the second incision creating an open circuit in a second branch of the wake circuit located in the second portion of the wireless tag.

16. The wireless tag of claim 1, further comprising a resistor coupled between a battery and the same node.

17. The method of claim 15, wherein the first criteria comprises determining the location of the wireless tag corresponds to a predetermined location.

18. The wireless tag of claim 6, wherein the main body comprises an adhesive layer on an exterior surface of the wireless tag.

19. The method of claim 17, further comprising, after the wireless transducing circuit has been reactivated, performing functions corresponding to a second journey or job of the wireless tag.

20. The method of claim 19, further comprising:
- determining the wireless tag has satisfied a second criteria corresponding to the second job or journey of the wireless tag;
- in response to determining the wireless tag has satisfied the second criteria, deactivating the wireless transducing circuit of the wireless tag;
- after the wireless transducing circuit of the wireless tag has been deactivated in response to determining the wireless tag has satisfied the second criteria, reactivating the wireless transducing circuit of the wireless tag, by making a third incision in a third portion of the wireless tag, the third incision creating an open circuit in a third branch of the wake circuit locating in the third portion of the wireless tag.

21. The method of claim 15, the first criteria comprising one or more selected from a group comprising: the wireless tag receiving an instruction from a wireless node of an Internet of Things (IOT) system associated with the wireless tag, the wireless tag detecting presence of a first wireless node of the associated IOT system, and measuring a sensor value within a threshold range using a sensor of the wireless tag.

* * * * *